(12) United States Patent
Kaplan et al.

(10) Patent No.: US 7,478,073 B2
(45) Date of Patent: Jan. 13, 2009

(54) ARCHITECTURE FOR SELF-DEVELOPING DEVICES

(75) Inventors: Frederic Kaplan, Paris (FR); Pierre-Yves Oudeyer, Paris (FR)

(73) Assignee: Sony France, Clichy la Garenne (FR)

( * ) Notice: Subject to any disclaimer, the term of this patent is extended or adjusted under 35 U.S.C. 154(b) by 34 days.

(21) Appl. No.: 10/861,146

(22) Filed: Jun. 4, 2004

(65) Prior Publication Data

US 2005/0021483 A1 Jan. 27, 2005

(30) Foreign Application Priority Data

Jun. 6, 2003 (EP) .................. 03291359

(51) Int. Cl.
 G06F 15/18 (2006.01)
 G05B 13/00 (2006.01)
(52) U.S. Cl. ............................ 706/12; 700/48; 700/250
(58) Field of Classification Search ................... 706/12; 700/48
 See application file for complete search history.

(56) References Cited

U.S. PATENT DOCUMENTS 5,774,632 A * 6/1998 Kaske ......................... 706/25
2002/0198853 A1 12/2002 Rose

FOREIGN PATENT DOCUMENTS

FR          2 811 449       1/2002

OTHER PUBLICATIONS

Mohamad H. Hassoun, Fundamentals of Artificial Neural Networks, 1995, The MIT Press, pp. 417-419.*
Chong et al., A Framework for Simulation-based Network Control via Hindsight Optimization, 2000, Proceedings of the 39th IEEE Conference on Decision and Control, pp. 1433-1438.*
"Learning and communication in imitation: an autonomous robot perspective" by P. Andry et al, IEEE Transactions on Systems, Man and Cybernetics, Part A: Systems and Humans, 31(5):431-444, Sep. 2001.

(Continued)

Primary Examiner—David R Vincent
Assistant Examiner—Nathan H Brown, Jr.
(74) Attorney, Agent, or Firm—Oblon, Spivak, McClelland, Maier & Neustadt, P.C.

(57) ABSTRACT

A self-developing device (1) capable of open-ended development makes use of a special motivational system for selecting which action should be taken on the environment by an associated sensory-motor apparatus (2). For a given candidate action, a motivational module (11) calculates a reward associated with the corresponding values that would be taken by one or more motivational variables that are independent of the nature of the associated sensory-motor apparatus. Preferred motivational variables are dependent on the developmental history of the device (1), and include variables quantifying the predictability, familiarity and stability of sensory-motor variables serving as the inputs to the device (1). The sensory-motor variables represent the status of the external environment and/or the internal resources (3) of the sensory-motor apparatus (2) whose behavior is controlled by the self-developing device (1). Open-ended development is enabled by attributing a reward which is proportional to the rate of change of the history-dependent motivational variables.

14 Claims, 14 Drawing Sheets

OTHER PUBLICATIONS

"Better visions through manipulation" by G. Metta and P. Fitzpatrick, from Proceedings of the second international workshop on epigenetics robotics: modeling cognitive development in robotic systems, p. 97-104, ed. C. Prince et al, 2002.

"A developmental approach accelerates learning of joint attention" by Y. Nagai et al, Proceedings of the second international conference of development and learning, 2002.

Articulations of sensory-motor experiences by forwarding forward model by J. Tani in "from animals to animats 7", pub. MIT Press, Cambridge Ma., USA, 2002.

"A sensory-motor account of vision and visual consciousness" by J. O'Regan and A. Noe, in Behavioural and Brain Sciences, 24(5), 2001.

"Active vision and feature selection in evolutionary behavioral systems" by D. Marocco and D. Floreano, in "From animals to animats 7", pub. Mit Press, Cambridge Ma., USA, 2002.

"Finding structure in time" by J.L. Elman from Cognitive Science, 14:179-211, 1990.

"Development of an autonomous quadruped robot for robot entertainment" by M. Fujita et H. Kitano, in "Autonomous Robots", 5:7-20, 1998.

"Control of selective perception using Bayes nets and decision theory" by R.D. Rimey and C.M. Brown, from International Journal of Computer Vision, 12(2):173-207, 1994.

An evolutionary active-vision system by T. Kato and D. Floreano, Proc. Of the congress on evolutionary computation (CECO01), IEEE Press, 2001.

Huang X, Weng J: "Novelty and Reinforcement Learning in the Value System of Developmental Robots" Proceedings Second International Workshop on Epigenetic Robotics: Modeling Cognitive Development in Robotic Systems 94, Aug. 10-11, 2002, X002280505.

Kulakov A, Stojanov G: "Structures, inner values, hierarchies and stages: essentials for developmental robot architectures" Proceedings Second International Workshop on Epigenetic Robotics: Modeling Cognitive Development in Robotic Systems, Aug. 10-11, 2002, XP 002280506.

* cited by examiner

ARCHITECTURE FOR SELF-DEVELOPING DEVICES

The present invention relates to an architecture for self-developing devices. More particularly, the invention relates to self-developing devices adapted so as to be capable of continuously developing new know-how (this is sometimes referred to as the capacity to engage in "lifelong learning").

The present invention typically finds application in sensory-motor devices such as robotic devices.

It is to be understood that, in the present document, when the expression "sensory-motor" is used the word "motor" does not necessarily entail physical motion. The word "motor" is used, in opposition to the word "sensory", so as to designate the effect a device or agent has on its environment rather than the perception that agent has of its environment. For a robotic device the term "motor" may indeed designate physical actions performed by the device, e.g. changing the attitude of its head, changing the angle of a joint, etc. However, for an autonomous agent implemented in software, the term "motor" can designate signals which the agent causes to be output so as to affect its environment.

The aim of developmental robotics is to build devices capable of lifelong learning. One of the challenges for research in this area is to find design principles for robots so that they are capable of extending their sensory-motor competences. These robots usually start with crude capabilities for perception and action, and try to bootstrap new know-how based on their "experience". Several researchers have investigated how some particular competence can emerge using a bottom-up mechanism—see, for example, "Learning and communication in imitation: an autonomous robot perspective" by P. Andry et al, IEEE Transactions on Systems, Man and Cybernetics, Part A: Systems and Humans, 31(5):431-444, September, 2001; "Better vision through manipulation" by G. Metta and P. Fitzpatrick, from "Proceedings of the second international workshop on epigenetics robotics: modeling cognitive development in robotic systems", p. 97-104, ed. C. Prince et al, 2002 "A developmental approach accelerates learning of joint attention" by Y. Nagai et al, Proceedings of the second international conference of development and learning, 2002; and "Articulations of sensory-motor experiences by forwarding forward model" by J. Tani in "From animals to animats 7", pub. MIT Press, Cambridge Mass., USA, 2002.

Different types of systems can be envisaged for motivating the boost-strapping of know-how. Conventionally, motivational systems are task-dependent. One possible approach consists in defining a reward function adapted to the behavior that the robot has to develop. When the agent performs the desired task it receives feedback (a reward), typically from the environment or from an external user. Several state-of-the art techniques in machine learning show how a robot can learn to behave in order to maximize such a reward function—see, for example, "Reinforcement learning: A survey" by L. P. Kaelbling et al, Journal of Artificial Intelligence Research, 4, 1996.

FIG. 1(a) illustrates in schematic form the architecture of a conventional behaviour-based agent adapted to behave so as to maximize a reward function. As shown in FIG. 1(a), the architecture of the conventional agent can be represented in terms of the interaction of three processes: a "situation awareness" process, a "motivation" process, and an "actuation" process.

The "situation awareness" process corresponds to the components and functions within the agent which serve to determine or characterize what is currently happening, and serve to "understand" it or put it into context. This process determines what is happening by looking at what is the status of the external environment (perceived via the agent's sensors), what is the status of the internal environment (that is, the agent's internal systems and/or resources), and what is the current behaviour being exhibited by the agent (for example, what are the positions of the agent's limbs, the attitude of its head, etc.).

The "situation awareness" process will generally have a knowledge base or model against which it can compare the current situation. This enables the agent to "understand" the current situation and/or to put it into context. For example, the agent may be able to decide whether the current situation has happened before and, if so, with what frequency, or to attribute a label to the current situation (e.g. "I am under a tree"). This process may be able to anticipate, based on past experience, what will happen in the near future, both at the sensory and motor level. In a general manner, the "situation awareness" process is aware of the sensory-motor trajectory that the agent is experiencing. According to some proposals, the agent's knowledge base or model can be dynamically updated depending upon the agent's experience.

The "actuation process" corresponds to the components and functions within the agent which decide which action the agent should perform next, and then implement that action. In general, the "actuation" process will decide, based on data from the "situation awareness" process and the "motivation" process, which action should be performed in order to obtain the greatest reward.

The "motivation" process evaluates the desirability of a given sensory-motor situation. A situation is desirable if it results in significant rewards. Conventionally, the "motivation" process evaluates the desirability of a situation that may be created as a result of action performed by the agent. Thus, the output from the "motivation" process plays a role in the selection of action to be performed by the agent.

In some known systems, several internal "motivational variables" are defined and are associated with reward functions. The agent adopts a behaviour which maximizes the "reward" as evaluated according to the reward functions. Typically, motivational variables are calculated from the values of internal and external variables which represent, respectively, the status of the agent's internal systems and the status of the agent's sensor inputs.

Conventionally, both the motivational variables and the associated reward functions are specific to the task the robot has to learn. It means that for each new behavior to be developed, the designer has to define new motivational variables and reward functions. For example, if it important for an agent to maintain a particular level of hydration then it would have a sensor detecting the current level of hydration (the output of which constitutes a sensory-motor variable "level of hydration") and an associated motivational variable representing a motivation such as "thirst". When the "level of hydration" variable reaches a value at or near the low end of the permitted range then the associated motivational variable "thirst" will take a large value. This motivational variable is specific to the task of maintaining correct hydration and cannot readily be reused for any other purpose.

Moreover, the aim of reward functions is usually to ensure that the agent adopts behaviour which will keep input sensory-motor variables within a predefined range. For example, the sensory-motor variable "level of hydration" may need to be kept within a specified range to ensure correct operation of the agent. Accordingly the reward function will be designed such that there will be a large reward associated with action which minimizes the value of the motivational variable "thirst".

The preferred embodiments of the present invention provide a new kind of system, which can be termed "a self-developing device", that can develop new competences from scratch, driven only by internal motivations. The motivational principles used by the device are independent of any particular task. As a consequence, they can constitute the basis for a general approach to development of sensory-motor competences.

The preferred embodiments of the invention make use of a motivational system in which internal motivational variables are history-dependent, that is, the value of the motivational variable depends upon the developmental history of the self-developing device (either upon the values taken by associated sensory-motor variables at different times, or upon the evolution of the internal parameters of a device or devices cooperating in the computation of the motivational variable).

The preferred embodiments of the invention also provide a new kind of device in which behaviour can be selected based on rewards which are proportional to the rate of change (i.e. the derivative) of the value of an internal motivational variable, not just minimizing or maximizing the motivational variable's value.

The present invention provides a self-developing device comprising:

input means for determining the value of a set of one or more sensory-motor variables representative of the status of the environment;

control means for outputting a set of one or more control signals adapted to control action of a sensory-motor apparatus with which the self-developing device is associated in use;

a motivation module for calculating a reward associated with a candidate value that can be taken by said set of control signals; and selection means for deciding, based on reward values calculated for candidate control-signal values by the motivation module, which value should be taken by said set of control signals, the selection means controlling the control means to output the selected value;

wherein the motivation module is adapted to evaluate rewards by calculating a function of at least one motivational variable whose value is derived from said set of sensory-motor variables;

characterized in that the motivation module uses a computation device adapted to perform a history-dependent calculation to calculate the value of said at least one motivational variable, said history-dependent calculation being dependent upon at least one of:

a) one or more time-varying internal parameters of the computation device or of a device cooperating with the computation device in the computation of the at least one motivational variable, and, b) values taken at different times by said at least one sensory-motor variable of said set.

Because the self-developing device of the present invention changes its behavior autonomously driven by motivational principles that are independent of a particular task, the same "engine" can be applied to a variety of sensory-motor development problems and the same device can engage in a process of life-long learning.

Moreover, the motivational variables applied by the motivation module are history-dependent variables, that is, the value of the motivational variable depends upon the evolution over time of an underlying sensory-motor variable or the evolution over time of the internal parameters of the device(s) involved in computing the motivational variable.

By making use of history-dependent motivational variables, the reward available to the self-developing device when selecting a particular behaviour changes over time as a result of the history of the device. Thus, the behaviour that is necessary in order to obtain a reward evolves dependent upon the development, or experience, of the self-developing device.

Preferably, the motivation module calculates a reward of increased value when there is a large change in a history-dependent motivational variable. This drives the self-developing device towards open-ended development, enabling it to extend its "awareness" of its environment as it develops new sensory-motor competences. The self-developing device discovers its environment (and any actuators associated with itself) through sensory-motor exploration. It is by causing action on its environment that the self-developing device recognizes situations. As this sensory-motor exploration continues in an open-ended manner, the "awareness" of the device keeps increasing.

The way in which the self-developing device develops depends on (a) the physical constraints of the sensory-motor apparatus with which it is associated and (b) the environment in which the device is placed. Two independent devices of this type will engage in developmental pathways that tend to be similar because of (a) but different because of (b). As each self-developing device follows a unique developmental path, it can be considered to be unique. In several applications, this uniqueness resulting from the history of the device is what makes it valuable.

Examples of preferred types of history-dependent motivational variable that can be used in the present invention are variables indicative of the predictability, familiarity and stability of sensory-motor variables that are input to the self-developing device.

According to the present invention, the motivation module will typically determine the reward associated with a candidate set of motor control signals based on a single reward function associated with a single type of history-dependent motivational variable (for example, a reward function which takes a high value when the predictability of the system increases). However, it is possible to take into account two or more reward functions, using a weighted sum to evaluate an overall reward associated with a candidate set of motor control signals.

In certain preferred embodiments of the invention, the self-developing device includes a prediction module which is capable of recurrently predicting a series of future values of the sensory-motor variables and motivational variables. The control means generates a group of different candidate sets of control signals, and the motivation module calculates an expected reward for each candidate set in the group, based on the series of rewards expected to be obtained when the motivational variables take the series of respective future values predicted by the prediction module for that candidate set. The candidate set which produces the greatest expected reward will be selected for output.

The self-developing device of the present invention is, in effect, a behaviour engine that decides which action should be taken by an autonomous agent with which the self-developing device is associated. In use, this behaviour engine will typically form part of the control portion of a device (such as a robotic device) which includes sensors for determining properties of the external environment and/or the status of the device's internal resources, and includes actuators and/or signal generators to implement the selected action.

According to this aspect of the invention, a robot (or other autonomous agent) can be obtained which is capable of open-ended learning.

The above and further objects, features and advantages of the present invention will become apparent from the following description of preferred embodiments thereof, given by way of example, and illustrated by the accompanying drawings, in which:

FIG. 1 shows, in schematic form, how the architecture of a device can be represented in terms of the interaction of three processes, in which:

Figure 7:
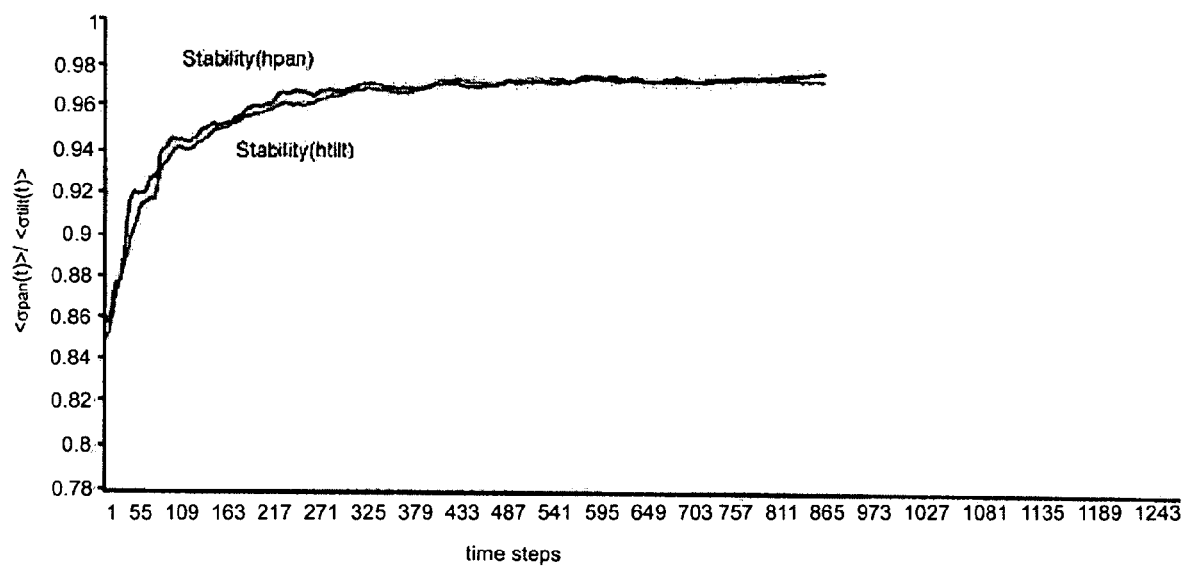
Figure 8:
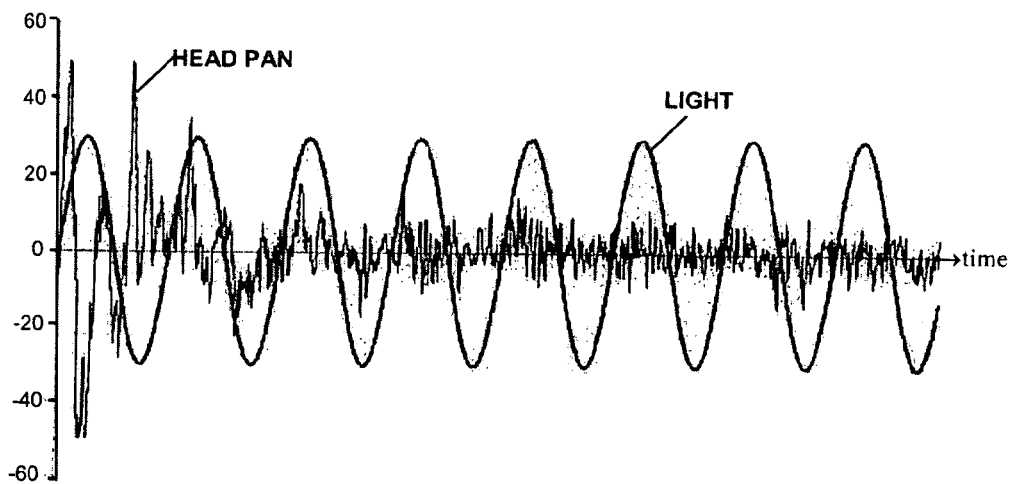
Figure 9:
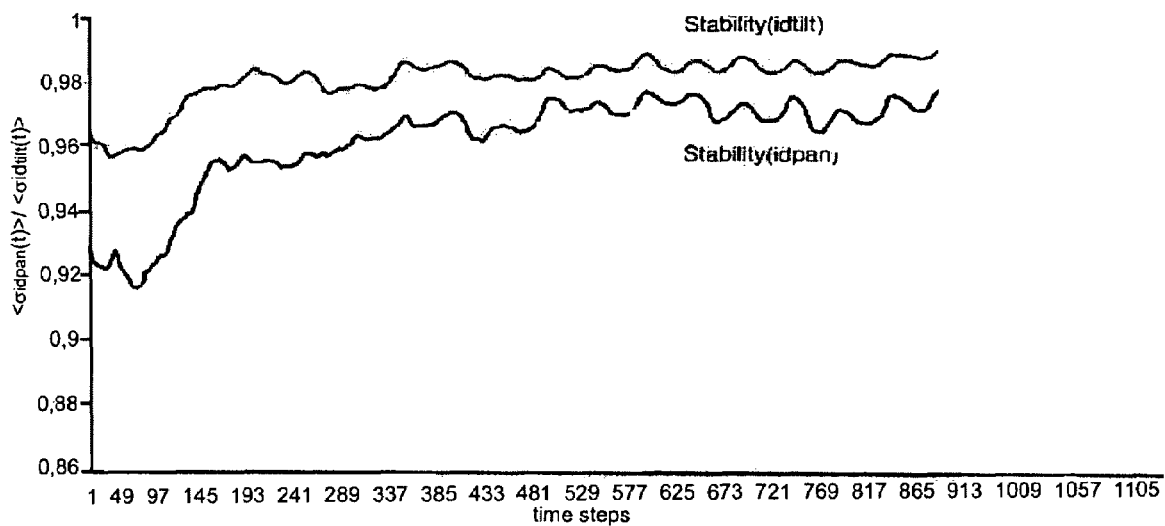
Figure 10:
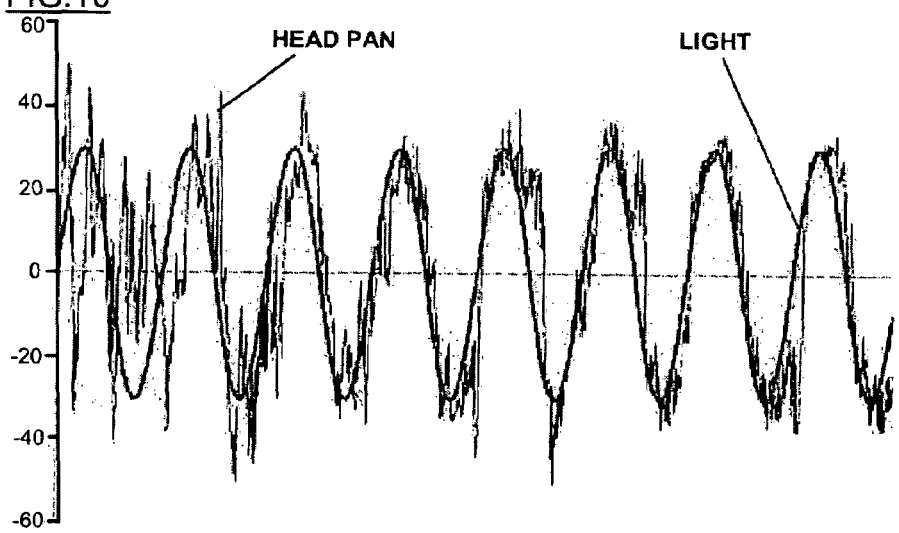
Figure 11:
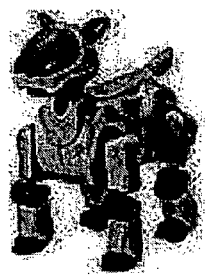
Figure 12:
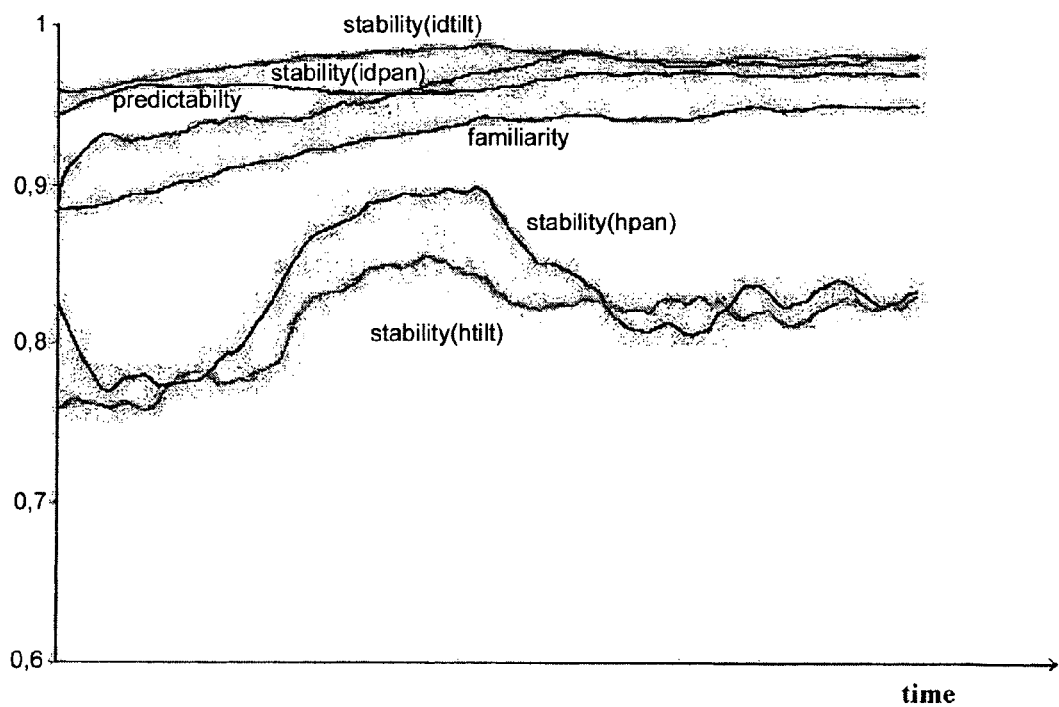
Figure 13:
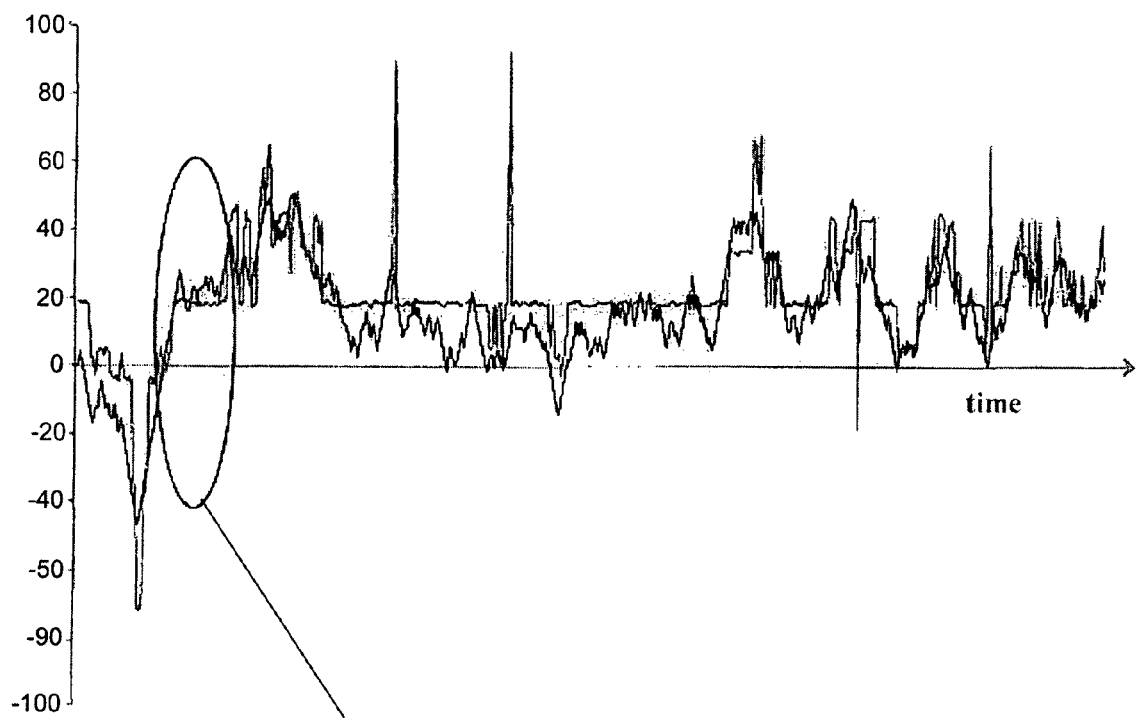
Figure 14:
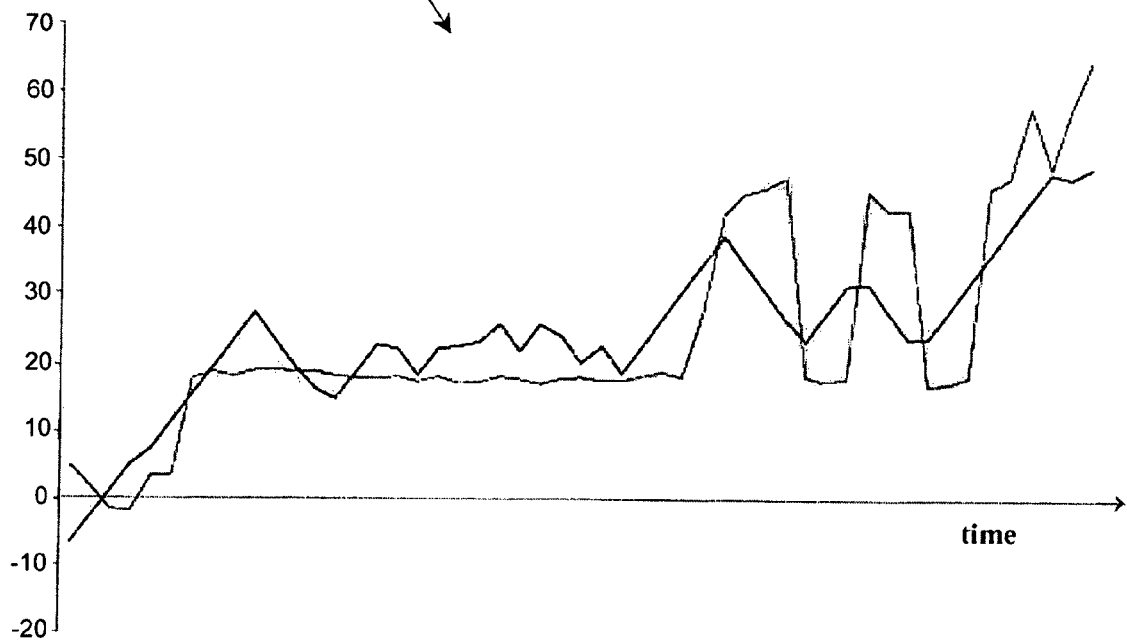
Figure 15:
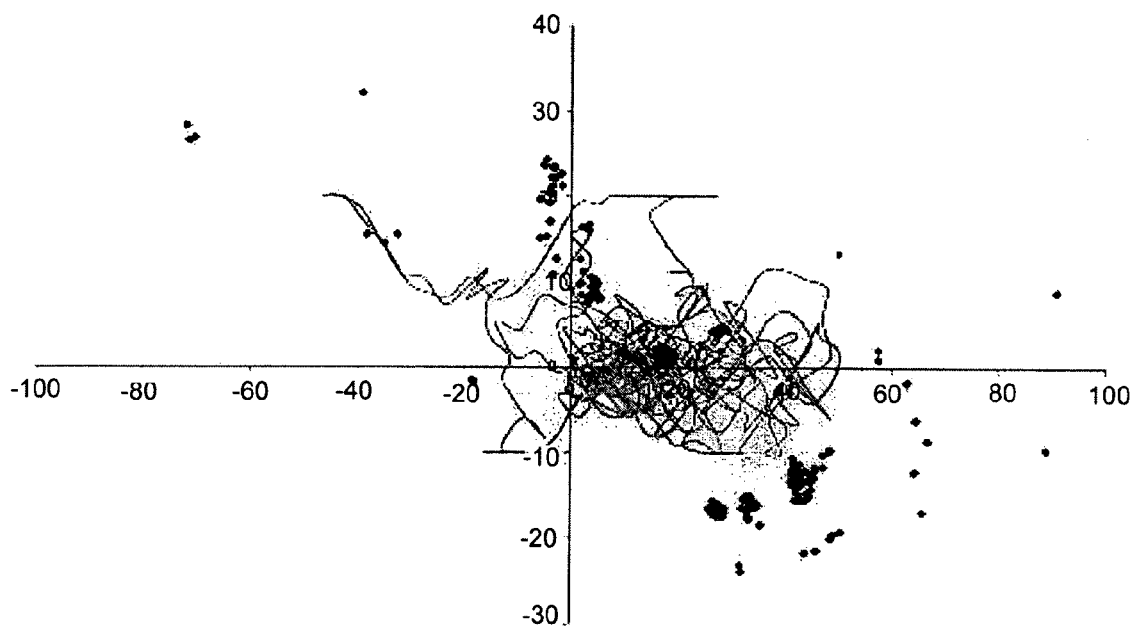
Figure 17:
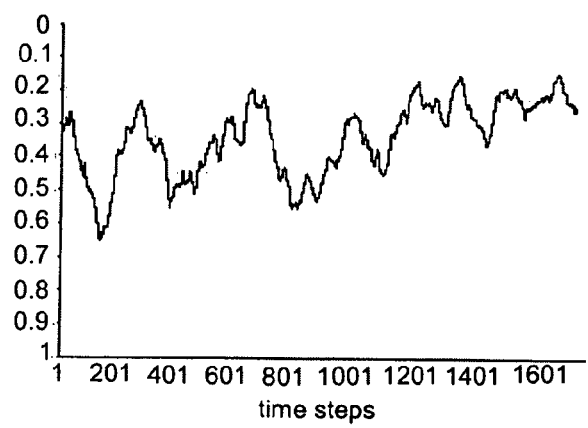
Figure 16:
Figure 18:
Figure 19:
Figure 20:
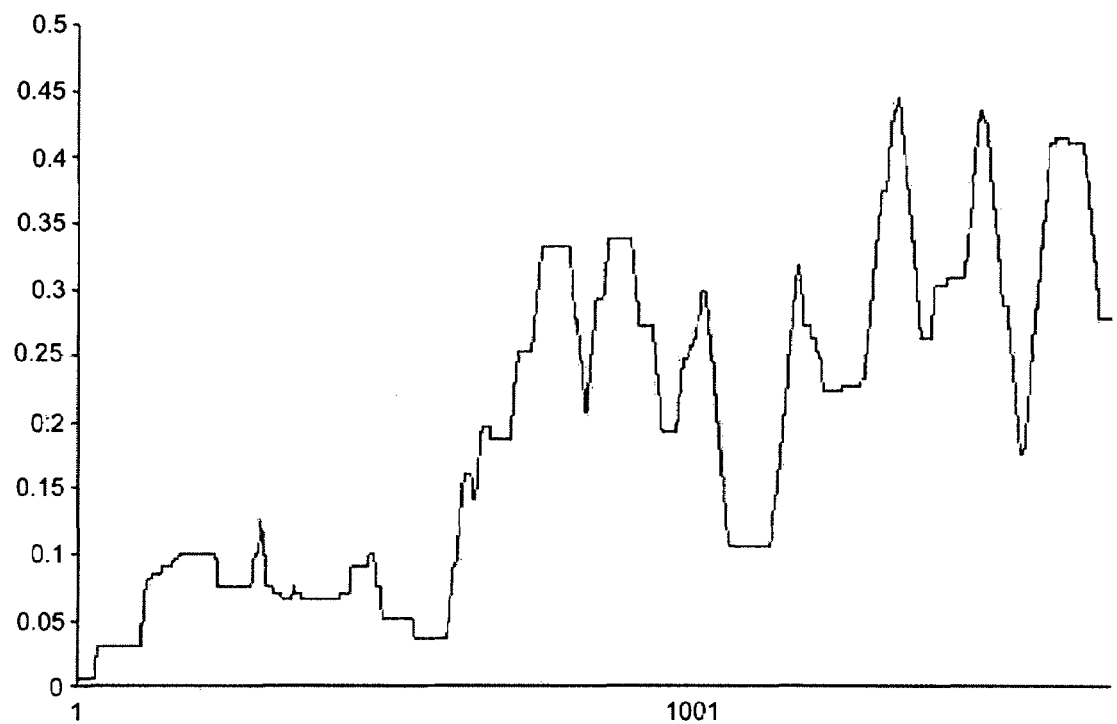
Figure 21:
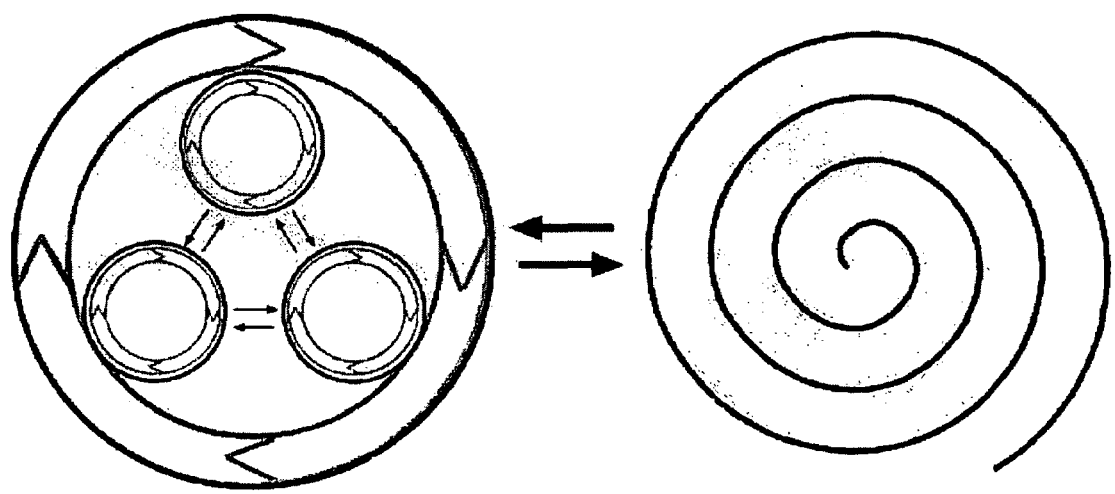
Figure 22:
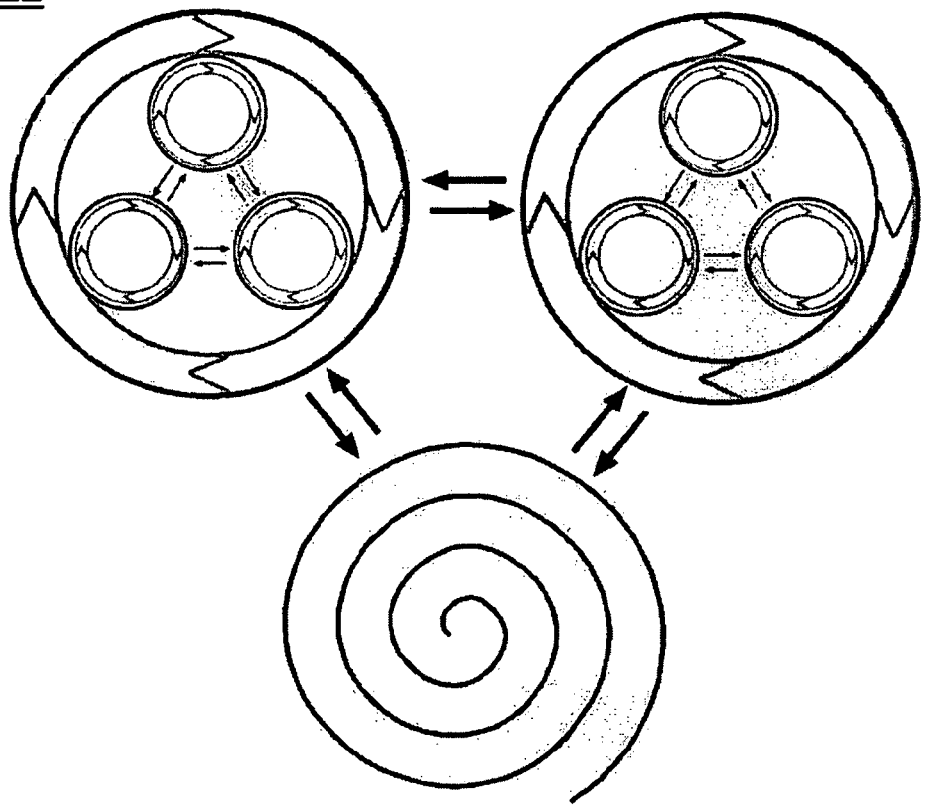
Figure 23:
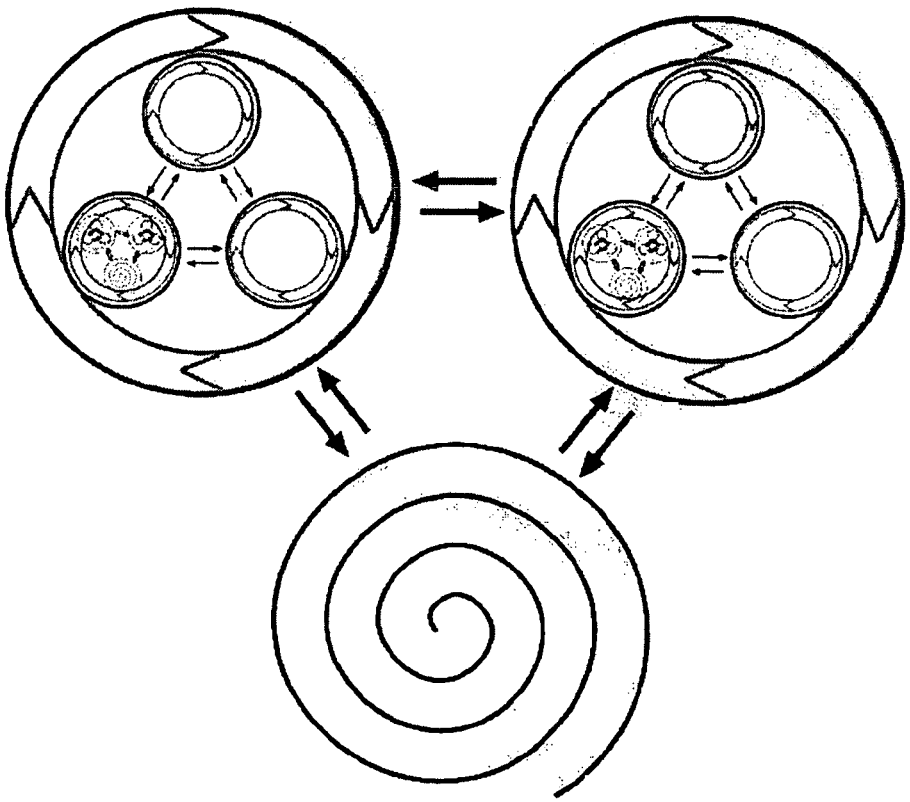
Figure 24:
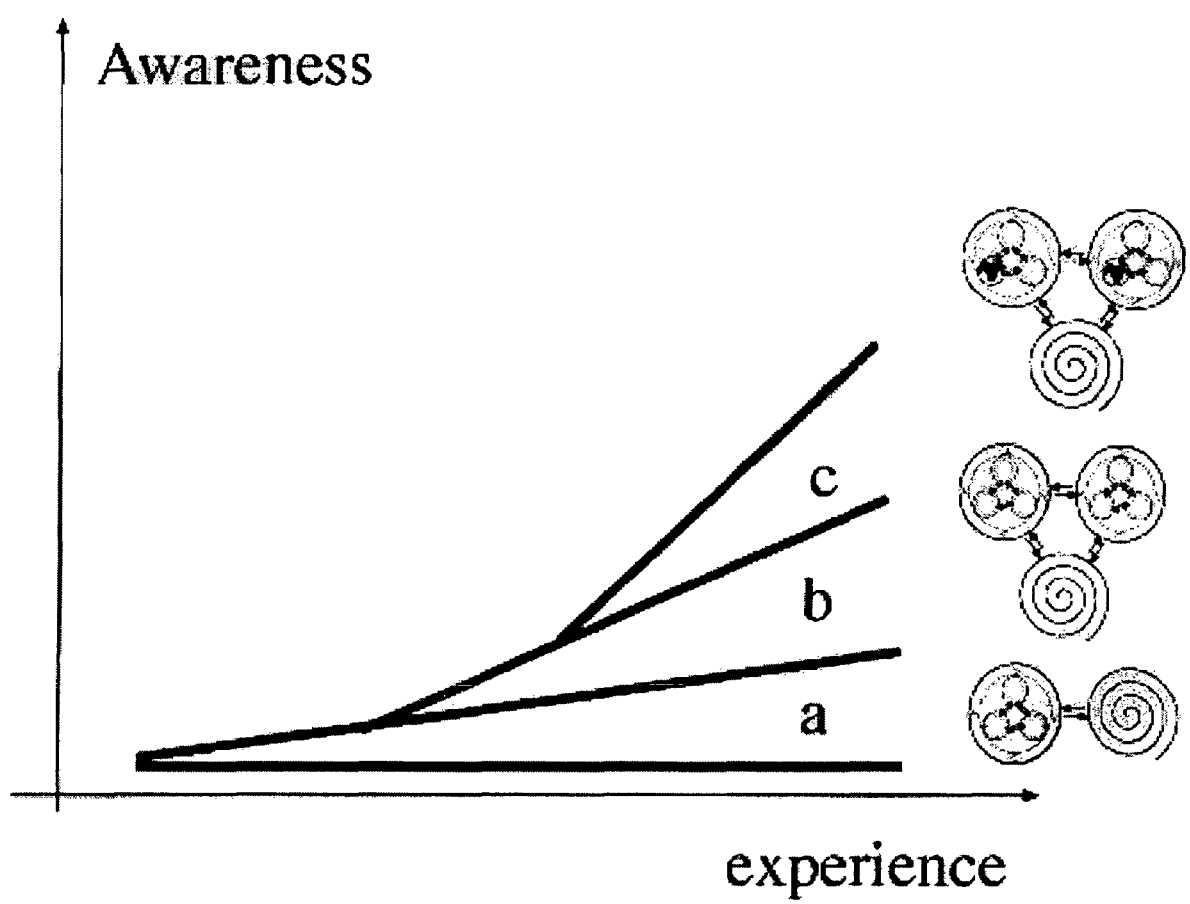

FIG. 7 is a graph showing the evolution of the average of a motivational variable "Stability of head pan position", $\sigma_{pan}(t)$, and the evolution of the average of a motivational variable "Stability of head tilt position", $\sigma_{tilt}(t)$, during a third experiment, performed by simulation, in which a reward function generates a reward for maximization of the stability of the head position, with regard to the first embodiment of the invention;

FIG. 8 is a graph showing the evolution of the "head pan position" variable, $h_{pan}$, during the experiment of FIG. 7;

FIG. 9 is a graph showing the evolution of the average of a motivational variable "Stability of the light's relative position in the pan direction", $\sigma_{idpan}(t)$, and the evolution of the average of a motivational variable "Stability of the light's relative position in the tilt direction", $\sigma_{idtilt}(t)$, during a fourth experiment, performed by simulation, in which a reward function generates a reward for maximization of the stability of the light's relative position, with regard to the first embodiment of the invention;

FIG. 10 is a graph showing the evolution of the "head pan position" variable, $h_{pan}$, during the experiment of FIG. 9;

FIG. 11 is a photograph of a robotic device whose behaviour can be controlled by making use of the motivational variables employed in the simulations of FIGS. 3 to 10;

FIG. 12 is a graph showing the evolution of six motivational variables within the device of FIG. 11 during a further experiment;

FIG. 13 is a graph showing the evolution of the head pan position of the device of FIG. 11, and the position of a perceived light, in the experiment of FIG. 12;

FIG. 14 shows, at magnified scale, a detail of FIG. 13;

FIG. 15 shows the head pan-tilt trajectory of the device of FIG. 11 during the experiment of FIG. 12;

FIG. 16 is a sequence of 6 images which illustrates the evolution of the behaviour of a retina according to a second embodiment of the present invention, during an experiment;

FIG. 17 is a graph showing how a motivational variable "average predictability" evolves during the experiment of FIG. 16;

FIG. 18 is a combined graph/image illustrating the trajectory of the centre of the retina at the beginning of the experiment of FIG. 16;

FIG. 19 is a combined graph/image illustrating the trajectory of the centre of the retina at the end of the experiment of FIG. 16;

FIG. 20 is a graph showing the percentage of time steps during which the centre of the retina was located in the face region of an image, during the experiment of FIG. 16;

FIG. 21 is a diagram illustrating schematically a first-order coupling achieved as a self-developing device according to the invention gains knowledge of the environment;

FIG. 22 is a diagram illustrating schematically a second-order coupling achieved as two self-developing devices according to the invention gain knowledge of the environment and of each other;

FIG. 23 is a diagram illustrating schematically a third-order coupling achieved as two self-developing devices according to the invention acquire the ability to enter into complex interactions with each other; and FIG. 24 is a diagram schematically illustrating the way in which a self-developing device according to the present invention can progressively develop so as to establish first, second- and third-order couplings.

The general architecture of a self-developing device according to the present invention will now be described, and will be followed by detailed descriptions of certain examples illustrating how this architecture can be used for bootstrapping new sensory-motor know-how.

In the following detailed description it will be assumed that the self-developing device is embodied in a robotic apparatus of some kind, which acts in relation to the external environment via one or more actuators. However, it is to be understood that the self-developing device of the invention can also be embodied in software agents and the like which act on the environment in ways which do not involve physical motion.

Figure 2:
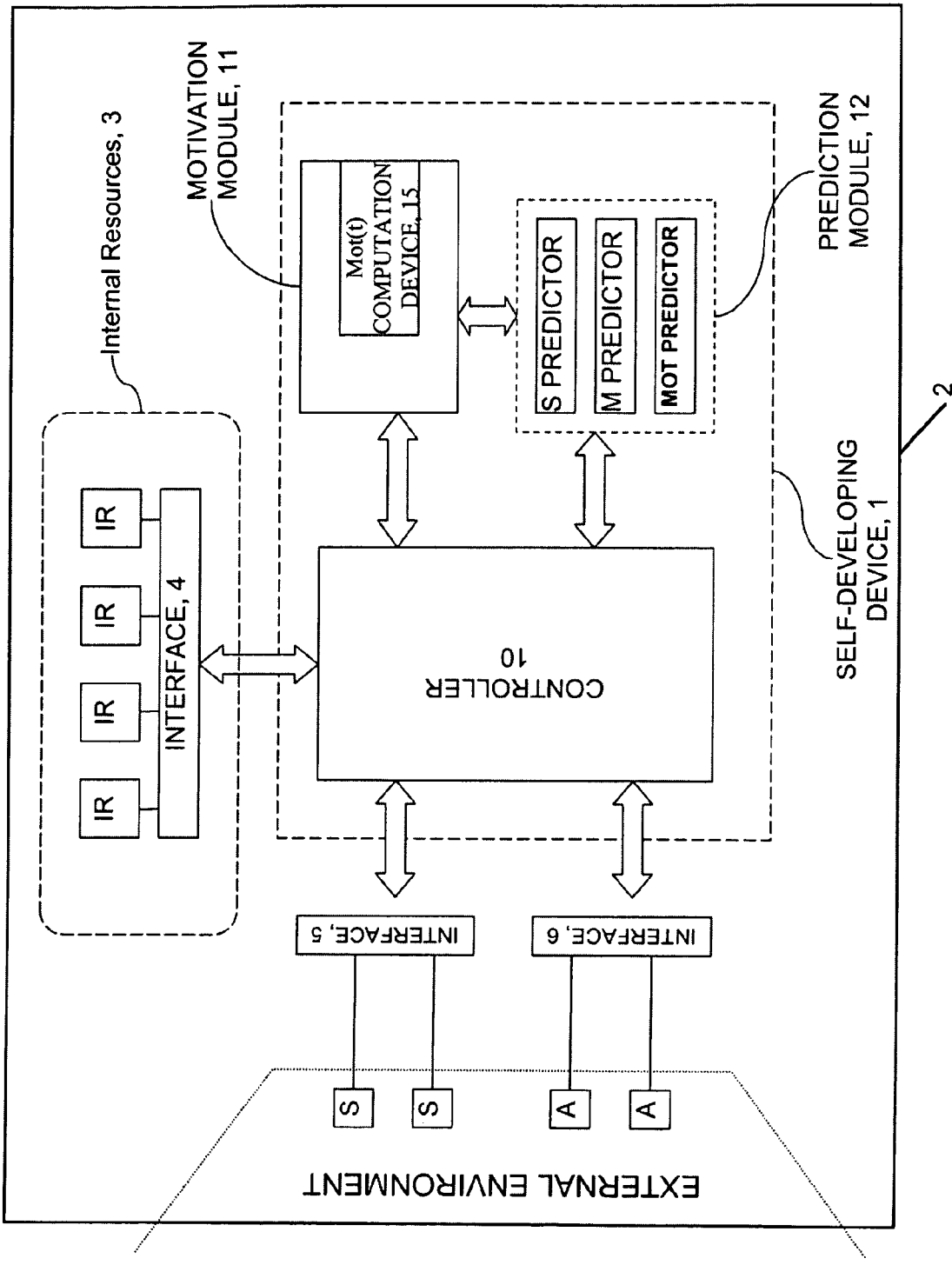
FIG. 2 is a block diagram showing in schematic form the main components of a sensory-motor apparatus equipped with a self-developing device according to a preferred embodiment of the present invention.

FIG. 2 illustrates the main components of a self-developing device 1 according to a preferred embodiment of the invention, which serves as a behaviour engine for a robotic apparatus 2. In other words, the behaviour of the robotic apparatus 2 is controlled by the self-developing device 1.

The self-developing device (SDD) 1 is a sensory-motor device which derives information about the environment internal to the robotic apparatus 2 (that is, data regarding the status of the robotic apparatus's internal resources 3), via an interface 4, and obtains information about the external environment from sensors, S, via an interface 5. The SDD 1 is also aware of the status of the current behaviour of the robotic apparatus 2 in the external environment, that is, it is aware of what is the status of various actuators A of the robotic apparatus 2. The SDD controls the actuators A and receives data from them via an interface 6.

The SDD 1 has three main components: a controller (or actuation centre) 10, a motivation module 11 and a prediction module 12. The motivation module 11 comprises a computation device 15 which computes the values of motivational variables. The computation module 15 may cooperate with other components, for example the prediction module 12, in order to calculate the value of one or more motivational variable. The prediction module preferably includes three prediction devices ($\Pi_m$, $\Pi_s$ and $\Pi_{mot}$) which take the current sensory-motor situation as an input and try to predict respectively the future motor situation, the future sensory situation and the future state of the motivation vector.

The architecture and functioning of the SDD 1 will now be described in greater detail.

Inputs and Outputs

At any given time t the SDD's perception of the environment (external and internal) can be summarized by a vector S(t) and its action on the environment can be summarized by a vector M(t). In a general manner, the components of the vector S(t) comprise the values of the signals derived from the internal and external sensors, the components of the vector M(t) are the values of variables describing the status of the actuators. In general M(t) will correspond to the control signals sent to the actuators at the time t. The effect of the signal M(t) on the actuator may be delayed, depending upon how the actuator works. The sensory-motor vector SM(t) summarizes both kinds of information.

Incidentally, it is not mandatory for S(t) and M(t) to include data relating to every single one of the sensors and actuators which may be present in the sensory-motor device 2 with which the SDD 1 is associated.

The behavior of the SDD consists in determining what should be its current behaviour M(t) based on the current perceived (sensory) situation S(t) and on previous sensory-motor situations SM(t-1), SM(t-2), . . . . Given the constraints provided by the environment, the SDD 1 develops in an unsupervised manner.

Once again, as explained above, the self-developing device may act upon the environment in a manner which does not require physical motion, for example, when the SDD is a software agent which acts on the environment by outputting signals of various kinds.

Overview of the Architecture

Figure 1A:
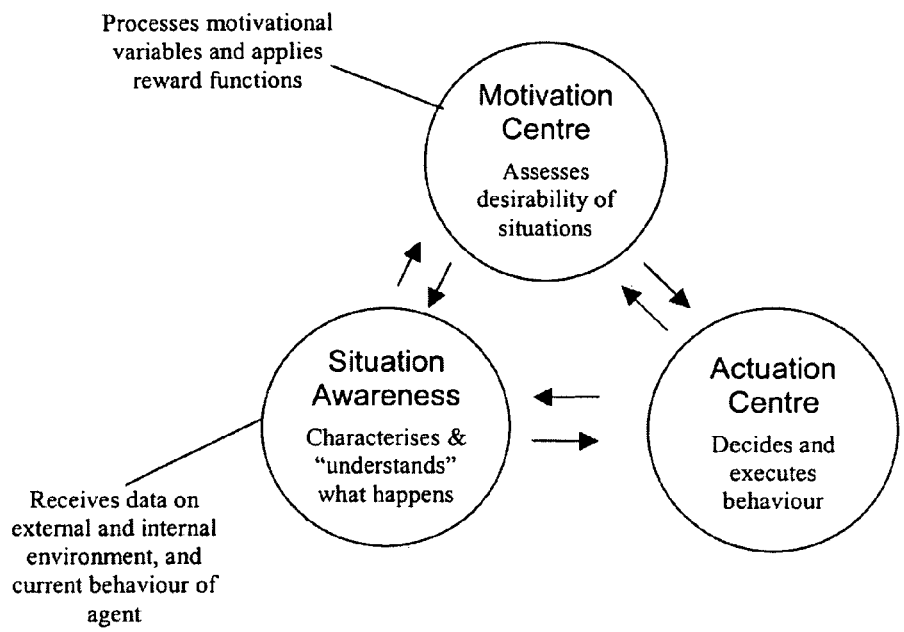
FIG. 1A represents the architecture of a conventional behaviour-based agent.
Figure 1B:
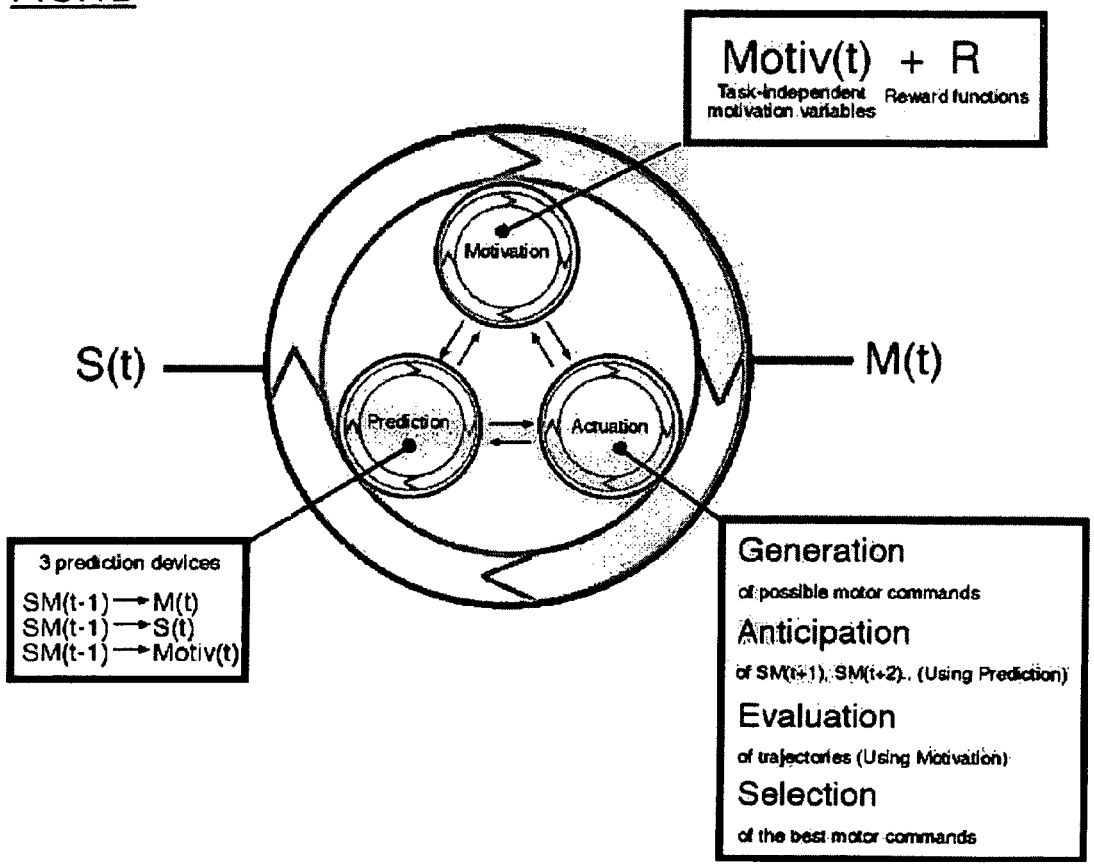
FIG. 1B represents the architecture of a self-developing device according to the present invention.

In a similar way to a conventional behaviour-based agent, the architecture of a self-developing device according to the present invention can be schematized by the interaction of three processes, as illustrated schematically in FIG. 1B. The three processes can be characterized as: a "motivation" process, a "prediction" process and an "actuation" process.

Once again, the "motivation" process is responsible for the evaluation of the desirability of a given sensory-motor situation. A set of one or more motivational variables Mot(t) is defined and associated with a set of reward functions R. An important feature of the self-developing devices according to the present invention is the use of motivation variables which are independent of the nature of the sensory-motor apparatus whose behaviour is being controlled. These variables typically result from internal computations based on the behavior of the two other processes (Prediction and Actuation)—see below. The "motivation" process is conducted by the motivation module 11 represented in FIG. 2.

The computation device 15 computes values for the motivational variables Mot(t) based on SM(t). Advantageously, computational device 15 is capable of making computations of three kinds:

a) computations in which the value of Mot(t) depends only on SM(t), that is:

$Mot(t)=f(SM(t))$.

These will be traditional kinds of motivational variables.

b) computations that are "historic" in the sense that the value of Mot(t) depends upon SM(t), SM(t-1), etc. that is:

$Mot(t)=f(SM(t), SM(t-1), SM(t-2), \ldots)$

In other words the values of the motivational variables depend upon sensory-motor vector values at more than one time.

c) computations that are "historic" or "development-dependent" because the manner of computing Mot(t) based on SM(t) depends upon the history of the computation device and/or the history of one or more other devices which cooperate with the computation device in the calculation of the motivational variables, that is:

$Mot(t)=g(SM(t))$, where g changes over time as the computation device (and/or cooperating device) evolves.

In this case, it is necessary to have knowledge of parameters internal to the computation device 15 and cooperating devices in order to determine what is the appropriate function g to apply at a given time. The nature of these internal parameters depends upon the nature of the computation device and cooperating devices. If one of the devices cooperating in the computation comprise a neural network, then "type (c)" computations of Mot(t) may require knowledge of the current values of the weights of the neural network. If one of the devices cooperating in the computation is prototype-based, then "type (c)" computations of Mot(t) may require knowledge of the current set of prototypes, etc. The computation device 15 and devices, such as the prediction module 12, with which it may cooperate in the calculation of motivational variables are adaptive devices which means that the values of their internal parameters will change based on experience. Thus, the appropriate function g of (SM(t)) will change over time.

The "prediction" process tries to predict the evolution of the sensory-motor trajectories, in other words what SM(t) will be given SM(t-1), SM(t-2), etc. The "prediction" process is implemented by the prediction module 12 of FIG. 2, which advantageously makes use of three prediction devices dedicated respectively to the prediction of M(t), S(t) and Mot(t). All the "understanding" the device has of its environment, its "awareness", is embodied in the rules applied by these prediction devices.

Finally, the "actuation" process decides, based on the status of the two other processes, which action should be performed in order to obtain rewards. As illustrated in FIG. 2, the "actuation" process is implemented by a controller 10, which can also be designated "actuation centre". According to the preferred embodiments of the present invention, this controller 10 implements four functions:

(a) generation of candidate motor commands, (b) anticipation of the corresponding sensory-motor trajectories (using the Prediction process, i.e. prediction module 12), that is prediction of SM(t+1), SM(t+2), etc. from SM(t), SM(t-1), SM(t-2), etc., based on the expected consequences of implementing the candidate motor commands, (c) evaluation of each simulated trajectory in terms of the corresponding expected rewards (using the "motivation" process) and, eventually, (d) selection of the best (i.e. most rewarding) motor commands from amongst the candidates.

The motivation, prediction and actuation processes evolve based on the experiences of the SDD 1, as indicated by the arrows shown in the circles representing these processes in FIG. 1B. What the SDD is aware of, what it is motivated for and the way it acts on its environment change over time as the result of its developmental trajectory (this evolution is indicated by the arrows surrounding the three processes in FIG. 1B). The above three processes will now be considered in more detail.

Motivation

As indicated above, the motivation process is based on a set of one or more motivational variables $mot_i$. The present invention makes use of motivational variables that are independent of the particular sensory-motor device with which the SDD is being used. Being rather abstract, these motivational variables can be used to drive the behaviour and development of substantially any sensory-motor device. Moreover, these motivational variables are independent of the particular task being performed by the apparatus associated with the SDD.

In order to create the condition for an open-ended sensory-motor exploration, motivational variables have been chosen whose value depends on the developmental history of the device. This means that the way of receiving rewards for such motivations is constantly changing as the device develops. These motivational variables are calculated using the computation device 15 according to computations of types b) and c) described above. It can be advantageous for the computation device 15 to cooperate with other components of the SDD 1 in order to calculate the motivational variables.

Examples of the Preferred Motivational Variables According to the Invention

Below there are details of three kinds of motivational variables that have been used in embodiments of SDD 1 according to the present invention with good results: these are "Predictability", "Familarity" and "Stability". However, it is to be understood that this list is not exhaustive—it is expected that other kinds of motivational variables could be used whose value depends on the developmental history of the SDD (either evolution of SM(t) or evolution of the internal parameters of the device(s) involved in the computation of the motivational variables).

Predictability: The "predictability" motivational variable seeks to quantify to what extent the SDD can predict the current sensory context S(t) based on the previous sensory-motor context SM(t−1). As mentioned above, the SDD 1 is equipped with a prediction module 12 that tries to learn sensory-motor trajectories. If e(SM(t−1),S(t)) is the current error for predicting S(t) by the S Predictor based on SM(t−1), one possible definition of the predictability P(t) is given by:

$$P(t)=1-e(SM(t-1),S(t)).$$

It will be seen that calculation of the motivational variable P(t) involves data from the prediction module 12 as well as computation by the computation device 15. The value of this motivational variable at a given time will thus depend upon the evolution of the internal parameters of both these components.

Familiarity: The "familiarity" motivational variable seeks to quantify to what extent the sensory-motor transition that leads to S(t) from SM(t−1) is a common pathway. The computation device 15 of the SDD 1 is equipped with a subsystem evaluating the frequency of this transition (that is, the number of times the sensory-motor transition SM(t−1)→S(t) has occurred during a recent time period {(t−T) to t}. If $f_T$(SM(t−1),S(t)) is the current frequency of the transition that leads to S(t), the familiarity motivational variable F(t) can be defined as:

$$F(t)=f_T(SM(t-1),S(t))$$

Stability: The "stability" motivational variable seeks to quantify whether or not the current sensory variable $s_i$ of S(t) is far from its average value. The computation device 15 of the SDD 1 tracks the average value $<s_i>_T$ for the recent period {(t−T) to t}. So, for each sensory variable $s_i$ one possible definition for the stabilitity $\sigma_i$(t) is given by:

$$\sigma_i(t)=1-\sqrt{\{(s_i-<s_i>_T)^2\}}$$

It will be understood that the "Predictability" motivational variable is calculated using computations of type (c) and the "Stability" motivational variable is computed using computations of type (b) described above. The "Familiarity" motivational variable can be calculated using computations that can be considered to be type (b) or type (c) depending upon whether the frequency of occurrence of a given transition is evaluated over the whole "lifetime" of operation of the device or over a shorter period, and on whether or not the length of this period is adaptive.

Reward Functions

Each motivational variable v is associated with a reward function r(v,t). It takes the general form:

$$r(v,t)=f_r(v(t), v(t-1), v(t-2), \dots)$$

In other words, the value of the reward can depend upon one, two or a series of successive values of the motivational variable v.

In the preferred embodiments of the present invention four kinds of reward functions can be used, $r_{max}$(v,t), $r_{min}$(v,t), $r_{inc}$(v,t) and $r_{dec}$(v,t).

$r_{max}$(v,t) (or $r_{min}$(v,t)): When using this reward function, the device is rewarded when it maximizes (or minimizes) the value v of the associated motivational variable. This is similar to the way in which motivational variables are generally treated (e.g homeostatic models in "Designing sociable robots" by C. Breazeal, Bradford book—M.I.T. Press, 2002).

$$r_{max}(v,t)=v(t),$$

From this definition of $r_{max}$(v,t) it follows that the reward is maximized when the value of the motivational variable is maximized. (In the case where it is desired to minimize the value v of the motivational variable, one could use the definition $r_{max}$(v,t)=1−v(t).)

$r_{inc}$(v,t) (or $r_{dec}$(v,t)): when using this reward function, the device tries to maximize increases (or, for $r_{dec}$(v,t), to maximize decreases) in the value of the motivational variable instead of maximizing (or minimizing) the variable itself. In this case it can be considered that:

when the SDD seeks to maximize increases in the "predictability" motivational variable it is seeking "learning" experiences, that is, experiences which increase its understanding of the environment, when the SDD seeks to maximize increases in the "familiarity" motivational variable it is seeking "discoveries", and when the SDD seeks to maximize increases in the "stability" motivational variable it is seeking strategies that lead to a better control of its environment.

As shall be seen, this reward function $r_{inc}$(v,t) is important with regard to the dynamics of the system.

The reward function $r_{inc}$(v,t) can be defined, as follows:

$$r_{inc}(v, t) = \begin{cases} (v(t) - v(t-1)) & : v(t) > v(t-1) \\ 0 & : v(t-1) \geq v(t) \end{cases}$$

It follows from the above definition of the reward function $r_{inc}$(v,t) that the greater the increase in the value of the motivational variable, the higher the reward generated by this reward function.

When the self-developing device explores a new behaviour based on $r_{inc}(v,t)$, initially there will be relatively large increases in history-dependent motivational variables, such as predictability P(t), familiarity F(t), and stability σ(t). Thus, initially, the reward function $r_{inc}(v,t)$ will produce a large reward associated with the new behaviour. However, as the self-developing device becomes better acquainted with the "new" behaviour (which equates to gaining knowledge of its environment) the values of these motivational variables will change by smaller and smaller amounts. Thus, the reward function $r_{inc}(v,t)$ yields a smaller and smaller reward for adopting this behaviour. By using the reward function $r_{inc}(v,t)$ in association with history-dependent motivational variables, the self-developing device is driven to explore new behaviours and then, when they have been mastered, to move on to others.

The effects of $r_{inc}(v,t)$ and $r_{dec}(v,t)$ are not symmetrical. To some extent $r_{dec}(v,t)$ achieves a similar result to a reward function which seeks to minimize an associated motivational variable, whereas $r_{inc}(v,t)$ has a function which is very dissimilar from a reward function seeking to maximize an associated motivational variable. When associated with the preferred motiviational variables P(t), F(t) and σ(t), $r_{dec}(v,t)$ drives the system to behave in a manner which will lead to an increase in prediction error, into situations which are less and less familiar, and situations which are more and more unstable. When the self-developing device 1 is in a "safe" environment, use of $r_{dec}(v,t)$ with P(t), F(t) and σ(t) can provide good learning strategies.

The properties of the four reward functions can be summarized, as follows:

$r_{max}(v,t)$ provides conservative strategies, causing the sensory-motor device to do what it already does best.

$r_{inc}(v,t)$ drives the system to explore unknown situations using known ones, in order to progress.

$r_{min}(v,t)$ and $r_{dec}(v,t)$ cause novelty-driven exploration directing the system to progress towards what it does not yet master ($r_{min}(v,t)$) or towards what seems to be the most difficult to master ($r_{dec}(v,t)$). These strategies do not involve undue risk if the sensory-motor device is in a safe environment.

Calculating an "Overall Reward"

As will be seen from the specific embodiments discussed below, in many applications it is sufficient for the self-developing device to evaluate the reward associated with a given behaviour (that is, associated with taking a candidate action mi) by using a single reward function based on a single motivational variable.

However, it is also possible to make use of two or more reward functions, for example based on respective different motivational variables (although it is also possible to use different reward functions based on a common motivational variable—e.g. the motivational system could seek to optimize $r_{max}(P(t))$ and $r_{inc}(P(t))$ thus arriving at a compromise between exploration and conservative strategies).

In a case where the motivational system uses two or more reward functions, when assessing the desirability of a given candidate behaviour, the controller 10 of the SDD 1 must consider the overall reward RM(t) that would be obtained as a result of this behaviour, taking into account the reward functions associated with all the applicable motivational variables, Mot(t). Preferably, a parameter $\alpha_i$ is assigned to each motivational variable $mot_i$. This parameter $\alpha_i$ enables a relative weight to be assigned to each motivational variable when determining the overall reward of vector Mot(t).

$$R(M(t)) = \sum_{mot_i} \alpha_i \cdot r(mot_i, t)$$

The weights $\alpha_i$ can be preset by the designer of the SDD 1. Alternatively, for greater autonomy/task-independence, the weights can be determined automatically by a weight-setting device (not shown) which is used in conjunction with the SDD 1. The automatic weight-setting device will typically implement known machine-learning techniques and select weights in order to maximize an independent "fitness function". The automatic weight-setting device could be implemented using a further SDD.

Prediction

The awareness of the device comes from its ability to predict sensory-motor trajectories. Recognizing a situation is recognizing a sensory-motor pathway. This standpoint follows the lines of current research that consider that perception emerges from motor actions. In this context see, for example, "La construction du réel chez l'enfant" by J. Piaget, pub. Delachaux & Nieslte, Neuchatel & Paris, 1937; "The tree of knowledge: the biological roots of human understanding" by H. Maturana & F. Varela, pub. Shambhala, USA, 1992; "A sensory-motor account of vision and visual consciousness" by J. O'Regan and A. Noe, in Behavioural and Brain Sciences, 24(5), 2001; and "Le sens du mouvement" by A. Berthoz, pub. Editions Odile Jacob, Paris, France, 1997.

This view, also known as active perception, is now shared by a growing number of robotic engineers (see, for example, "Active vision and feature selection in evolutionary behavioral systems" by D. Marocco and D. Floreano, in "From Animals to Animats 7" op. cit., and "Better vision through manipulation" by G. Metta and P. Fitzpatrick, op. cit.).

At a given time t, the self-developing device of the present invention experiences a particular sensory-motor context that can be summarized in a vector SM(t). As mentioned above, the preferred embodiments of the present invention use three prediction devices: $\Pi_m$, $\Pi_s$, $\Pi_{mot}$. The three devices take the current situation SM(t) as an input and try to predict, respectively, the future motor situation M(t+1), the future sensory situation S(t+1) and the future state of the motivation vector Mot(t+1).

At each time step, the three devices learn the correct prediction by comparing the current situation with the previous one.

$\Pi_m(SM(t-1)) \rightarrow M(t)$ $\Pi_s(SM(t-1)) \rightarrow S(t)$ $\Pi_{mot}(SM(t-1)) \rightarrow Mot(t)$ where →indicates a comparison, $\Pi_m$ (SM(t−1)) is the prediction of M(t) made by prediction device $\Pi_m$ based on (SM(t−1)), $\Pi_s$ (SM(t−1)) is the prediction of S(t) made by prediction device $\Pi_s$ based on (SM(t−1)), and $\Pi_{mot}$ (SM(t−1)) is the prediction of Mot(t) made by prediction device $\Pi_{mot}$ based on (SM(t−1)).

The landscape of the motivation that $\Pi_{mot}$ must learn is dependent on the performance of the two other prediction devices. The motivational variable P(t) is determined by the error rate of $\Pi_s$, and the other motivational variables change according to the action selection process which in turn results from the prediction of $\Pi_m$ and $\Pi_s$ (see below). As a consequence, $\Pi_{mot}$ must adapt continuously during the bootstrapping process.

The prediction devices can be implemented in different manners, for instance:

- using a recurrent Elman neural network with a hidden layer/context layer (see "Finding structure in time" by J. L. Elman from Cognitive Science, 14:179-211, 1990). Because this network is recurrent it predicts its output based on the value of the sensory-motor vectors several time steps before t.
- using a prototype-based prediction system that learns prototypic transitions and extrapolates the result for unknown regions. It takes the form of a set of vectors associating a static sensory-motor context SM(t−1) with the predicted vector (M(t),S(t) or Mot(t)). New prototypes are regularly learned in order to cover most of the sensory-motor space. The prediction is made by combining the results of the k closest prototypes. This prediction system is faster and more adaptive than the Elman network, but may prove to be less efficient for complex sensory-motor trajectories.

The general architecture according to the preferred embodiments of the present invention can be used regardless of the kind of devices that are employed in the prediction module 12. Thus the prediction devices Π can be implemented using a variety of state-of-the-art techniques other than those specifically mentioned above. However, it is desirable that the selected prediction devices have high performance in order to ensure efficient learning for the system as a whole.

Actuation

The actuation process performed by the controller 10 anticipates the possible evolutions of the sensory-motor trajectories and tries to choose the motor commands that should lead to the maximum reward. Several techniques taken from reinforcement learning literature can be used to solve these kind of problems—see, for example, "Reinforcement learning: A survey" by L. P. Kaelbling et al, op. cit. In the system according to the preferred embodiment of the present invention, the process can be separated into four phases:

Generation: The system constructs a set of candidate motor commands {mi}. For some applications this phase can be trivial, but more elaborate calculations will be required when dealing with complex actuators. As an example of a simple case: if the current value of an actuator control signal, $m_0$, is 0.7 then the controller 10 may randomly shift the current value so as to produce candidate values such as 0.55, 0.67, 0.8, 0.75, for $m_0$.

Anticipation: By using the prediction devices in a recurrent manner the self-developing device 1 simulates the sensory-motor evolutionary path $\{SM_{mi}\}$ that can be expected to arise for a given candidate set of motor commands, over T time steps. The system combines the result of both $\Pi_m$ and $\Pi_s$ to predict future sensory-motor situations and uses $\Pi_{mot}$ to predict the evolution of the motivation vector Mot(t).

Evaluation: For each evolutionary path $\{SM_{mi}\}$ an expected reward $R_{mi}$ is computed as the sum of all the future rewards expected to arise during the T time steps.

$$R_{mi}(t) = \sum_{j=1}^{t+T} R(Mot(j))$$

Prediction accuracy decreases if the value of T is too great. Typical acceptable values for T are in the range of 2 to 10.

Selection: The motor command {mi} corresponding to the highest $R_{mi}$ is chosen for output by the controller 10. in other words, the behaviour of the sensory-motor device 2 associated with the SDD 1 will be controlled according to the candidate command signals mi giving the greatest reward.

In order to evaluate to what extent the self-developing device of the present invention is capable of open-ended learning, the general architecture described above was implemented in two embodiments which are described below.

EMBODIMENT 1

A Simple Tracking System

This first embodiment was directed to a mechanism for bootstrapping competence in a simple visual tracking system. The system was intended to learn to track a moving light.

In the first months of their life, babies develop, almost from scratch, sensory-motor competences enabling them to localize lights sources, pay attention to movement and track moving objects (see "Understanding children's development" by P. Smith et al, pub. Blackwell, 1998). The embodiment presented here does not attempt to model precisely this developmental pathway but to illustrate how general motivational principles can drive the bootstrapping of corresponding competences.

The AIBO ERS-210, a four-legged robot produced by Sony Corporation, is equipped with a CCD camera and can turn its head in the pan and tilt directions (a third degree of liberty exists but is not exploited in this experiment)—see, "Development of an autonomous quadruped robot for robot entertainment" by M. Fujita et H. Kitano, in "Autonomous Robots", 5:7-20, 1998. In the present embodiment, the vision system of the AIBO ERS-210 was simplified to an extreme point and a self-developing device according to the invention was implemented in software in order to process sensory data provided by this vision system and to direct motor control of the pointing of the vision system.

The robot extracts from each image it analyses the point of maximum intensity. The visual system perceives only the coordinates of this maximum ($i_{dpan}, i_{dtilt}$) expressed relative to the image center. The robot also perceives the position of its head in a pan-tilt coordinate system ($h_{pan}, h_{tilt}$). At each time step its perception can be summarized by a vector S(t) having four dimensions.

$$S(t) = \begin{vmatrix} idpan(t) \\ idtilt(t) \\ hpan(t) \\ htilt(t) \end{vmatrix}$$

The robot moves its head according to motor commands ($m_{dpan}, m_{dtilt}$), $$\text{i.e. } M(t) = \begin{vmatrix} mdpan(t) \\ mdtilit(t) \end{vmatrix}$$

So, the sensory-motor vector SM(t) at each time step has 6 dimensions.

$$SM(t) = \begin{vmatrix} mdpan(t) \\ mdtilt(t) \\ idpan(t) \\ idtilt(t) \\ hpan(t) \\ htilt(t) \end{vmatrix}$$

Initially the SDD does not know anything about the sensory-motor device (here, a robot) with which it is associated. Can the robot equipped with the SDD develop a simple attention behavior in which it intentionally fixes its gaze on a certain number of things in its environment? To do this, it must discover the structure of several couplings in its sensory-motor device. It must discover, notably:

How a relative command ($m_{dpan}$, $m_{dtilt}$) affects the next position ($h_{pan}$, $h_{tilt}$) of the head. (This sensory-motor coupling is constrained by the head limit positions resulting from the structure of the robot's body.)

How a relative command ($m_{dpan}$, $m_{dtilt}$) affects the movement of the visual field, in particular the position of ($i_{dpan}$, $i_{dtilt}$). (This sensory-motor coupling is again constrained by the robot's body and also by the structure of what happens in the environment.)

In short, the robot must learn to perceive its environment by moving its head in the right manner.

A number of different motivational variables and associated reward functions could be defined, in accordance with the present invention, in an attempt to provide the robot with the ability to learn the desired tracking behaviour. For example, it could be contemplated to make use of reward functions based on any or all of the following motivational variables: the predictability variable P(t), the familiarity F(t) and four stability variables (one for each sensory-motor variable). This yields a possible motivational vector Mot(t) having 6 dimensions:

$$Mot(t) = \begin{vmatrix} P(t) \\ F(t) \\ \sigma idpan(t) \\ \sigma idtilt(t) \\ \sigma hpan(t) \\ \sigma htilt(t) \end{vmatrix}$$

Simulated Environment

In order better to understand the role of each internal motivation in determining the development of the robot's behaviour a series of experiments was conducted in a simple simulated environment. The presence of a light performing a sinusoidal movement in the environment was simulated, according to the following relationships:

$light_{pan}(t) = K^* \sin(p(t))$ $light_{tilt}(t) = L^* \sin(p(t) + \beta)$ $p(t+1) = p(t) + \delta$ where $\delta$=a small increment, L=the magnitude of the oscillations in the tilt domain, K=the magnitude of the oscillations in the pan domain, and $\beta$=the phase difference between the oscillations in the pan and tilt domains. The oscillations in the tilt domain have a smaller amplitude than in the pan domain (i.e. L<K).

The robot perceives the relative position of the light compared to its own position.

$i_{dpan}(t) = light_{pan}(t) - h_{pan}(t)$ $i_{dtilt}(t) = light_{tilt}(t) - h_{tilt}(t)$ At each time step, the SDD associated with the robot decides the most appropriate action $\{m_{dpan}, m_{dtilt}\}$ to perform. The effect of this action is simulated using the following simple rules:

$g_{pan}(t+1) = m_{dpan}(t) + h_{pan}(t)$ $g_{tilt}(t+1) = m_{dtilt}(t) + h_{tilt}(t)$ The constraints on the robot's body are simulated by imposing limits on the possible positions for the head: $max_{pan}$, $min_{pan}$, $max_{tilt}$, $min_{tilt}$.

$$h_{pan}(t+1) = \begin{cases} max_{pan} & : g_{pan}(t+1) > max_{pan} \\ min_{pan} & : g_{pan}(t+1) < min_{pan} \\ g_{pan}(t+1) & : \text{otherwise} \end{cases}$$

A similar equation is defined for $h_{tilt}(t+1)$.

Increase in Predictability

In a first experiment, the robot was driven using a reward function based only on its "predictability" motivational variable. More particularly, the self-developing device driving the robot's behaviour made use of a reward function which rewards increases in the predictability level P(t), the magnitude of the reward being proportional to the size of the increase in P(t). In effect, this means that the robot seeks for "learning" situations. As it learns, sensory-motor trajectories that used to give rewards tend to be less interesting. These dynamics push the robot towards an open-ended dynamic of exploration.

Figure 3:
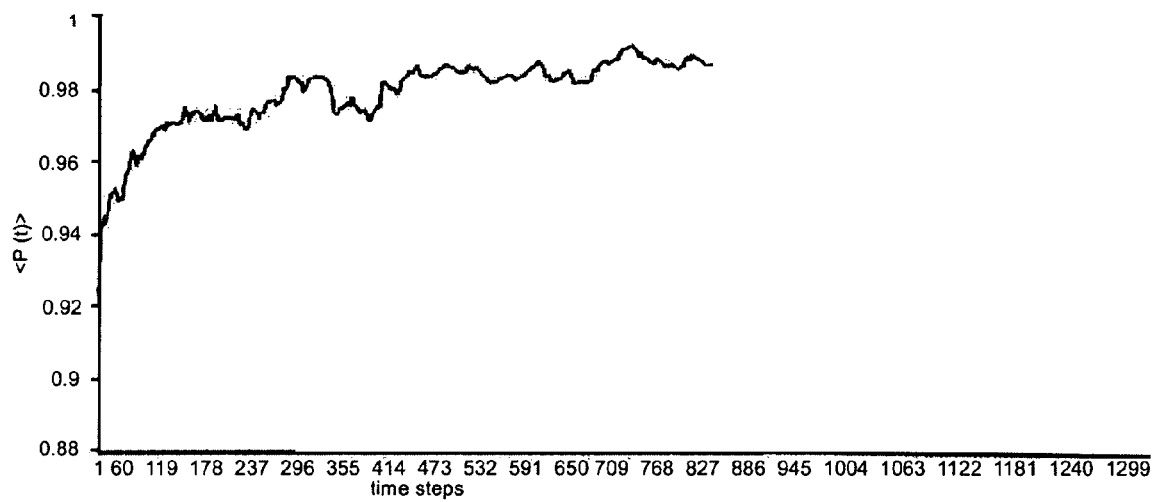
FIG. 3 is a graph showing the evolution of the average of a motivational variable "Predictability", P(t), during a first experiment, by simulation, in which a reward function generates a reward for increases in the "Predictability" motivational variable, with regard to a first embodiment of the invention implementing a simple vision system.

FIG. 3 shows the evolution of the average predictability level P(t) during this experiment. It quickly reaches a high value. This shows that the robot (or, more precisely its SDD) has learned the overall effect of movement on the light's position and on the position of its own head. As the robot tries to experience increases in predictability and not simply to maximize it, small oscillations can be seen near the maximum value. They correspond to new sensory-motor trajectories that the robot explores.

Figure 4:
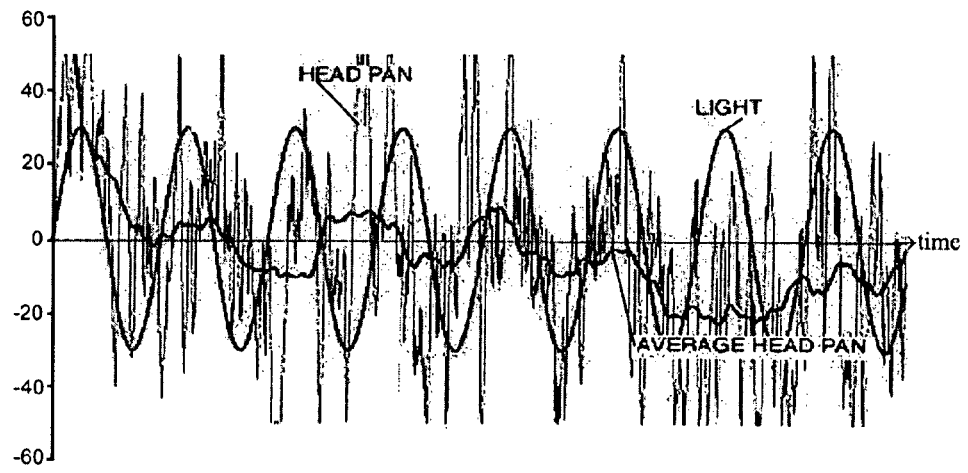
FIG. 4 is a graph showing the evolution of a "head pan position" variable, $h_{pan}$, during the experiment of FIG. 3.

FIG. 4 shows the evolution of $h_{pan}$, the pan position of the head, during 1000 time steps of the above-described experiment (the corresponding evolution of $light_{pan}$ is also indicated by the sinusoidal curve in FIG. 4). A very similar curve can be plotted for the tilt dimension. The movement is rather complex as the robot gets away from predictable sensory-motor trajectories and tries to explore new ones. It is interesting to observe that the movement is not completely decorrelated from the movement of the light as the robot explores different perceptual effects of its motor commands. The evolution of the average $h_{pan}$ position shows that the system progressively explores the amplitude of the possible pan positions by oscillating around the zero position.

Increase in Familiarity

In a second experiment, the robot was driven using a reward function based only on its "familiarity" motivational variable. More particularly, the self-developing device driving the robot's behaviour made use of a reward function which rewards increases in the familiarity level F(t), the magnitude of the reward being proportional to the size of the increase in familiarity. In a similar way as for predictability, unfamiliar situations tended to become familiar after a while and, as a consequence, less rewarding. These dynamics drive the robot into a continuous exploration behavior.

Figure 5:
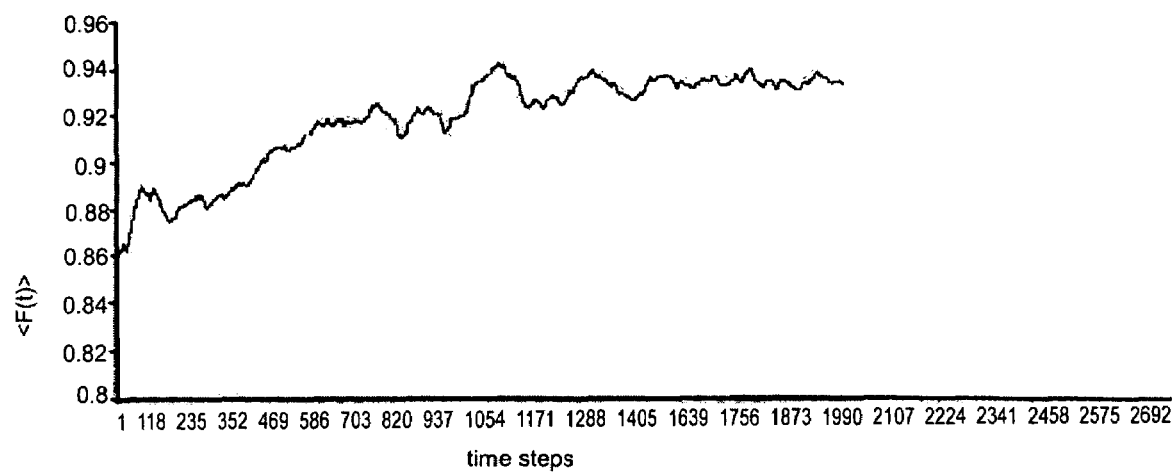
FIG. 5 is a graph showing the evolution of the average of a motivational variable "Familiarity", F(t), during a second experiment, by simulation, in which a reward function generates a reward for increases in the "Familiarity" motivational variable, with regard to the first embodiment of the invention.

FIG. 5 shows the evolution of the average familiarity level F(t) during this experiment. The robot manages progressively to reach a very high level of familiarity. Similarly to the evolution seen during the previous experiment, we see oscillations due to the pressure of experiencing increases in familiarity. Each reduction of the familiarity level corresponds to the exploration of new parts of the sensory-motor space.

Figure 6:
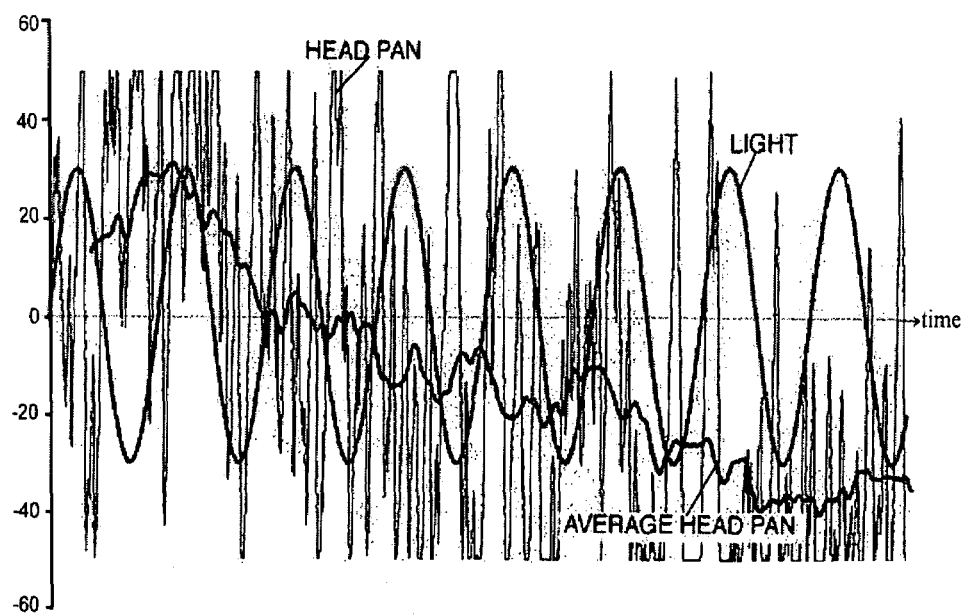
FIG. 6 is a graph showing the evolution of the "head pan position" variable, $h_{pan}$, during the experiment of FIG. 5.

FIG. 6 shows the evolution of the pan position of the head during 1000 time steps of the present experiment. The movement looks a bit like the one obtained in the first experiment, but some differences can be noticed. The average position curve shows the robot has first tended to explore positions corresponding to high pan values then progressively switched to low pan values. This switch, that seems to occur independently of the oscillation of the light, did not appear as clearly for the experiment on predictability. The familiarity motivation pushes the robot to explore trajectories in the sensory-motor space independently of how well it masters them. Employing reward functions using the familiarity and predictability motivations can be seen as two complementary ways for the SDD to get the sensory-motor device to explore different sensory-motor trajectories.

Maximization of Sensory Stability

A third set of experiments were conducted using reward functions based on the four motivational variables concerning the stability of each component of the sensory vector S(t). They were all associated with the maximize reward function $r_{max}$.

Head Stability

First of all the case was considered where the stability concerns the head position. This corresponds to the variables $\sigma_{hpan}(t)$ and $\sigma_{htilt}(t)$. The self-developing device driving the robot's behaviour employs a reward function which ensures that the robot seeks sensory-motor trajectories in which its head position, in pan and tilt, remains stable in time. FIG. 7 shows the evolution of average stability during an experiment in which the robot uses this reward system. In this context the task is rather easy, the robot has simply to discover that it has to stop moving its head in order to obtain significant rewards. Stability is reached rapidly for both the pan and tilt direction.

The evolution of head pan position, $h_{pan}$, during this experiment is graphed in FIG. 8. The evolution observed in FIG. 8 shows that the head position stabilizes around its initial position after a short period of oscillation. (The evolution of $light_{pan}$ is also indicated via the sinusoidal wave shown in FIG. 8).

Light Stability

Next the case was considered where rewards were associated with maximizing the stability ($\sigma_{idpan}$, $\sigma_{idtilt}$) of the relative position of the perceived light. In this case the task is a bit more complex as the light is not directly controlled by the robot. The robot has to discover that it can act upon the relative position of the light by moving its head in the appropriate directions.

FIG. 9 illustrates the evolution of the average stability of $\sigma_{idpan}$ and $\sigma_{idtilt}$ during an experiment using this reward system. The robot manages to control the stability of the light in the tilt domain faster than in the pan domain, probably because the movement has a smaller amplitude in the tilt domain (L<K).

FIG. 10 illustrates the evolution of the head pan position, $h_{pan}$, during the same experiment. After a short time for tuning, the robot develops a tracking behavior and follows the light quite precisely. As the robot seeks sensory stability, each movement of the light can be seen as a perturbation that it learns to compensate. The development of this visual know-how results directly from the effect of the environment on the sensory-motor device. (The evolution of $light_{pan}$ is also indicated via the sinusoidal wave shown in FIG. 10).

With this series of experiments, we have a clearer idea of the effect of each reward system on the bootstrapping process. The two first motivations, increase in predictability and familiarity, push the robot to explore its sensory-motor device. The last four, maximization of sensory stability, lead the robot, on the one hand, to stop moving its head, and, on the other hand, to develop a tracking behavior.

Experiment on the Robot

A further experiment was conducted on an AIBO ERS-210 (shown in FIG. 11). The software components for this experiment were written in C++ using the publicly available OPEN-R SDK. The software ran on board the AIBO ERS-210, and the data generated during the experiment were directly written on a MemoryStick for later analysis.

At each time step the robot computes the point of maximum light intensity in its visual field. The relative position of this point provides the two inputs $i_{dpan}(t)$ and $i_{dtilt}(t)$. The robot measures its own head position $h_{pan}(t)$ and $h_{tilt}(t)$. Unlike the case during the simulation experiments discussed above, this measurement is not completely accurate. In the same way, due to different mechanical constraints, the relative movement resulting from the action $m_{dpan}(t)$ and $m_{dtilt}(t)$ can be rather noisy.

The reward system used could potentially have included all six of the motivational variables previously studied. As mentioned earlier, in a case where multiple reward functions are used, the relative weight of each variable in the computation of the overall reward is preferably determined by the set of parameters $\alpha_i$.

For the present experiment, these weights $\alpha_i$ were set so that the robot developed the know-how for paying attention to the different light patches present in its environment. This means it should develop a tracking behavior but also an exploratory skill for not being stuck in front a given light.

As head stability is to some extent counterproductive for such a goal, it was decided that $\sigma_{hpan}(t)$ and $\sigma_{htilt}(t)$ should not be used as motivational variables in this experiment. As a consequence, all the reward functions were associated with the same weight $\alpha_i=k$, except the two controlling the head stability (which received the value $\alpha_i=0$).

The experiment lasted 10 minutes. The robot was placed in front of an uncontrolled office setting. FIG. 12 shows the evolution of the six motivational variables during this experiment. As expected, the four motivational variables associated with the weight k, obtained high values. The relative position of the light rapidly reached a plateau, but predictability and familiarity kept increasing. The motivational variables for head stability oscillated at a lower level.

FIG. 13 shows the evolution of head pan position during the experiment, as well as the position of the perceived light. The robot seems to track the light but, since the robot is motivated for exploration, its position oscillated around a local light maximum permitting the robot to find another local light maximum.

This behavior can be seen more clearly on FIG. 14 which magnifies a detail from FIG. 13. The head pan position increases so as to approach a local maximum, then oscillates around it for a while. At some point a larger oscillation makes the robot discover a higher local maximum. The robot switches back and forth several times between the two maxima and finally continues its exploration towards higher pan values. This kind of behavior is a typical result of the search to increase predictability and familiarity. The robot uses familiar and predictable contexts as bases for progressively continuing its exploration.

FIG. 15 illustrates the overall pan-tilt trajectory for the duration of the present experiment. It appears that the robot has concentrated its exploration on the righthand part of the scene. It seemed to have highly explored one particular area and progressively searched for other maxima in its immediate neighborhood. This exploration yields a kind of "map" of the position of the local light maxima, as shown on FIG. 15. This map can be used to characterize the place where the robot stands. This representation does not exist as such for the robot but is the result of the know-how it developed with its sensory-motor device. The robot is not capable of perceiving all these light positions at the same time, but it is confident (based on its acquired sensory-motor visual know-how) that they are there.

EMBODIMENT 2

An Self-Developing Active Gaze System

This experiment shows how the same general architecture can be used to develop an active vision system, that is, a vision system which concentrates on the active parts of a scene (which, in general, will be more important). This system develops the capability of recognizing visual situations, through sensory-motor exploration. This embodiment is inspired by research in developmental psychology about attention and eye movements—see "Eye movements and vision" by A. L. Yarbus, pub. Plenum Press, New York, 1967; "Animate vision" by D. Ballard, from Artificial Intelligence, 48:57-86, 1991; and "Control of selective perception using Bayes nets and decision theory" by R. D. Rimey and C. M. Brown, from International Journal of Computer Vision, 12(2):173-207, 1994.

The vision system described here shares some similarity with an active vision system described by Marocco and Floreano (see "An evolutionary active-vision system" by T. Kato and D. Floreano, Proc. Of the congress on evolutionary computation (CEC01), IEEE Press, 2001; and "Active vision and feature selection in evolutionary behavioral systems" by D. Marocco and D. Floreano, op. cit.). However, the latter uses an evolutionary robotics paradigm in order to evolve the desired behaviour: populations of robots are evolved and the best individuals are selected according to a predefined fitness function—see "Evolutionary Robotics: biology, intelligence and technology of self-organizing machines" by S. Nolfi and D. Floreano, pub. MIT Press, Cambridge, Mass., USA, 2000. By way of contrast, the system according to the present embodiment uses a developmental perspective to arrive at the desired behaviour.

In the present embodiment, a self-developing device was used to drive the behaviour of a system equipped with a square-shaped retina using an R×R matrix of perceptual cells. This retina is used to view an image. The position of the retina relative to the image can be changed, and the retina can zoom in and out. Based on the zooming factor, the retina averages the color of the image in order to produce a single value for each cell of the retina. With such a system, it is possible to rapidly scan the pattern present in the overall image and zoom in to perceive some details more accurately.

In the present embodiment, in order to become an active vision system the system has to learn how to "act" on the image by moving and zooming the retina in order to get a higher reward as defined by its reward system.

More precisely, for a given image snapshot I(t), the sensory vector S(t) contains the renormalized grayscale value of the R×R pixels of the retina.

$$S(t) = \begin{vmatrix} Pix_{1,1}(t) \\ Pix_{2,1}(t) \\ ... \\ Pix_{R,R}(t) \\ X(t) \\ Y(t) \\ Z(t) \end{vmatrix}$$

The motor vector M(t) contains the values for the three possible actions the retina can performed: changing the x and y values and the zooming factor.

$$M(t) = |Dx(t)Dy(t)Dz(t)|$$

As for the previous embodiment, the self-developing device does not have any prior knowledge about the sensory-motor device with which it is associated. It must discover the structure of several couplings in this sensory-motor device, notably it must learn to:

understand the effects of Dx(t), Dy(t), Dz(t) on X(t+1), Y(t+1) and Z(t+1). This is a context-independent sensory-motor mastery, yet the constraints linking the 6 variables are rather complex, in particular due to the boundaries of the visual fields.

understand the relationship between Dx(t), Dy(t), Dz(t) and the values of the pixels on the retina. This depends on the particular images the system is exploring, but the system must be capable of discovering sensory-motor trajectories that should be applicable in different contexts.

In this embodiment a reward function was used based only on the predictability motivational variable, P(t). It can be considered that there was a motivational vector of dimension 1 (corresponding only to the predictabily variable P(t))

$$Mot(t) = |P(t)|$$

Experimental Results: Minimizing Predictability

In this experiment, the self-developing device used a reward function $r_{min}(v,t)$ which assigned a higher reward when the predictability variable P(t) decreased—in other words the device seeks to minimize the value of the predictability variable. This means that the device tries to explore sensory-motor pathways that it masters the least. As it explores these pathways P(t) increases, which leads the system to change again its behavior. A similar result could have been obtained using the reward function $r_{dec}(v,t)$.

This experiment made use of a sequence of 200 image frames of a person talking, recorded using a video camera. During this sequence of images, the person's head, mouth, eyes and hands moved. This sequence of 200 frames was used as a cyclic image input I(t) for the system. FIG. 16 illustrates the behavior of the retina for a sequence of six images at given times in its development. The sequence of images in FIG. 16 runs from top-left to bottom-right. Values of the retina cells are shown in FIG. 16 using semi-transparent greyscale levels.

As can be seen from FIG. 16, the retina starts with a low zooming factor and progressively focuses on the upper part of head of the person. The square seen at the left upper part of the image reflects the value of P(t) (black low predictability, white high predictability).

The system was allowed to develop during 2000 time steps (10 cycles of the input video sequence). FIG. 17 shows the evolution of the average predictability <P(t)> during this period.

Despite the fact that the self-developing device seeks unpredictable situations (which explains why the curve regularly drops), the average predictability is increasing in the long run. This means that the system manages to be better at predicting the effects of the retina movements on the sequence of images.

FIGS. 18 and 19 illustrate two trajectories of the center of the retina, taken at the beginning of the development phase and the end of the experiment, repsectively. Both trajectories correspond to the same number of time steps but the first one is much more widely spread than the other. At the beginning of the experiment, the retina was scanning the whole image in a rather uniform manner. At the end of the experiment it seemed to concentrate on the moving parts (hands and heads) because they proved to be the most difficult to predict. The retina was not preprogrammed to pay attention to movements, but this functionality emerged driven by the system dynamics.

More precisely, FIG. 20 shows the time the retina spent in the "face area" during this experiment. The "face area" was manually defined for each image of the person talking, and a note was made of the number of time steps in which the retina was in that zone. FIG. 20 clearly shows that, after a first phase of exploration, the system focuses its attention on the face.

This second embodiment shows how a self-developing retina can autonomously develop the capability of focusing its attention on "interesting" aspects of its environment. The device is motivated by a general kind of "curiosity". Although in this experiment the system was illustrated using video images of a person talking, the system is not specialized for this kind of stimuli.

It will be seen from the above-described embodiments and experiments that the self-developing device architecture according to the present invention does indeed enable open-ended learning in different applications.

First Order, Second Order and Third Order Couplings

Using the architecture according to the present invention, a self-developing device can extend its "awareness" as it masters new sensory-motor know-how. This process can be viewed as the establishment of couplings of different kinds. Three kinds of couplings can be identified—first order coupling, second-order coupling and third-order coupling—although they all rely on similar bootstrapping mechanisms.

First order coupling concerns direct interaction with the stable aspects of the environment (see FIG. 21, in which the circular symbol represents an SDD and the spiral symbol represents the environment). By conducting sensory-motor experiments the device can develop attention mechanisms, a primitive idea of object, and contextual knowledge about its direct environment. Initially the device is immersed in a continuous flow of perceptual information and does not know how to act upon it in order to turn it into a structured world. The above-described experiments show how it can develop such a sensory-motor know-how.

Second-order couplings are couplings between self-developing devices and concern the development of coordinated interactions like joint attention or simple communicative behavior (see FIG. 22). If two self-developing devices share the same environment their behavior will have an effect on one another: they will engage in coupled developmental pathways.

Third-order couplings concern the coordination of second-order couplings to form a higher form of interaction (see FIG. 23). Examples of such couplings are complex dances, turn taking or linguistic behaviors. If two self-developing devices have developed a sufficiently good interactional know-how they can use this shared mastery to engage in more complex interaction which presupposes an initial repertoire of common interaction patterns.

The kind of self-developing devices described above can potentially establish all of these three kinds of couplings. Devices can be envisioned which will go through developmental pathways that would include the development of such complex competences, each new mastery building up on the previous ones. The progressive development of competences is illustrated schematically in FIG. 24.

Self-developing devices according to the present invention provide a general solution to a large number of bootstrapping problems. The motivation system that drives the development of such devices is independent of the nature of the sensory-motor apparatus to be controlled. For this reason, the same developmental engine can be used to explore the behavior of substantially any sensory-motor device. These devices may find application not only in entertainment robotics but also in many other kind of devices, for example: computer games, new musical instruments, wearable computers/intelligent clothes, interactive houses, internet software agents.

The skilled person will readily appreciate, based on his common general knowledge and the contents of the references cited above, what physical components and software routines to use to implement the various devices and functions described above. Accordingly, further details are not given here. Moreover, it will be understood that the partitioning of functions between distinct devices as described above with reference to FIG. 1B and FIG. 2 was made to simplify the discussion. Functions described as being performed by one specific device, for example, the controller 10, may in practice be performed by a different module, depending upon the implementation. Furthermore, the self-developing device can be implemented using modules which combine functions which are ascribed above to separate components. Finally, various of the functions may be partially or entirely implemented in software.

Although the present invention has been described above with reference to certain preferred embodiments thereof, it is to be understood that the invention is not limited by reference to the specific features of those preferred embodiments.

In particular, values for the "predictability", "familiarity" and "stability" variables can be calculated using different equations from those specified.

Furthermore, although the preferred embodiments make use only of motivational variables of the preferred kinds (which are independent of any particular sensory-motor apparatus, and historically-dependent), it is to be understood that the SDD of the invention could make use of a mix of motivational variables, some being motivational variables of the above preferred kind and others being more conventional, task-dependent motivational variables.

In a similar way, although the above-described preferred embodiments of the invention make use of four preferred types of reward function, it is to be understood that other kinds of reward functions can be used in addition.

The invention claimed is:

1. A computer readable medium encoded with computer program instructions which cause a processor to execute a method of generating control signals for controlling action of a sensory-motor apparatus, comprising:

determining the value (S(t)) of a set of one or more sensory variables (S) representative of information about an environment of said sensory-motor apparatus;

outputting a set of one or more control signals (M(t)) configured to control action of said sensory-motor apparatus;

calculating a respective reward (R(v,t)) associated with each of a plurality of candidate values ($M_{Cand}$) that can be taken by said set of control signals (M(t)), the calculating being adapted to evaluate rewards by calculating a function based on a set of one or more motivational variables ($mot_i$), said set of motivational variables including at least one task-independent internal motivational variable that is independent of the type of sensory-motor apparatus being controlled, the value of each motivational variable being derived based on at least one sensory-motor variable of a set of sensory-motor variables (SM) comprising said set of sensory variables (S) and a set of action variables (M) representative of the behavior of said sensory-motor apparatus; and deciding, which value should be taken by said set of control signals (M(t)), by analyzing the reward values calculated for respective different values ($M_{Cand}$) that can be taken by said set of control signals;

wherein the calculating of respective rewards comprises:

performing a history-dependent calculation to calculate the value of said at least one task-independent motivational variable ($mot_i$), said performing step comprising either:

a) applying a history-dependent function (g) to at least one sensory-motor variable of said set, said history-dependent function (g) depending on one or more time-varying internal parameters in the computation of the at least one motivational variable ($mot_i$), or b) applying a function (f) to values (SM(t),SM(t−1)) taken at different times by at least one sensory-motor variable of said set, predicting, for each of said plurality of candidate values of said control signals (M), values of sensory-motor variables (SM) and of said set of motivational variables ($mot_i$) at a series of future instants, and calculating, for each of the plurality of candidate values ($M_{Cand}$), a reward value ($R_{MCand}$) which comprises the sum of a series of expected future rewards corresponding to said predicted values of said set of motivational variables at said series of future instants, wherein each expected reward is evaluated by calculating a function (OR) based on said at least one task-independent internal motivational variable ($mot_i$); and wherein the outputting step comprises outputting the set of control signals chosen in the deciding step based on said reward values calculated in the calculating step.

2. The computer readable medium encoded with computer program instructions which cause a processor to execute a method of claim 1, further comprising:

predicting a value (S(t)) of at least one sensory variable in said set of sensory-motor variables at a first time (t) based on a value (SM(t−1)) of said set of sensory-motor variables at an earlier time (t−1); and evaluating rewards by calculating a function (R) of a predictability motivational variable (P) indicative of the accuracy of the prediction.

3. The computer readable medium encoded with computer program instructions which cause a processor to execute a method according to claim 2, further comprising:

evaluating a prediction error e(SM(t−1),S(t)) associated with the prediction of the value (S(t)) of said at least one sensory variable in said set of sensory-motor variables at said first time (t) based on a value (SM(t−1)) of said set of sensory-motor variables at an earlier time (t−1), and calculating a value (P(t)) of the predictability motivational variable at said first time (t), based on the evaluated prediction error, according to the following equation:

$$P(t)=1-e(SM(t-1),S(t)).$$

4. The computer readable medium encoded with computer program instructions which cause a processor to execute a method of claim 1, further comprising:

determining the frequency of a transition from a value (SM(t−1)) of said set of sensory-motor variables at an earlier time to a value (S(t)) of the set of sensory variables at a first time; and evaluating rewards by calculating a function of the value (F(t)) of a familiarity motivational variable (F) at said first time (t), said value (F(t)) of the familiarity motivational variable (F) being indicative of the frequency, of the transition to the value (S(t)) of the set of sensory variables at said first time (t) from the preceding value (SM(t−1)) of the set of sensory-motor variables at said earlier time (t−1).

5. The computer readable medium encoded with computer program instructions which cause a processor to execute a method of claim 4, further comprising:

evaluating the number of times ($f_T$(SM(t−1),S(t))), during a time period of the first length (T) preceding said first time (t), that a transition has occurred to the value (S(t)) of the set of sensory variables at said first time (t) from the preceding value (SM(t−1)) of the set of sensory-motor variables at said earlier time; and calculating said value (F(t)) of the familiarity motivational variable (F) at said first time (t), based on said evaluated number of times, according to the following equation:

$$F(t)=f_T(SM(t-1),S(t)).$$

6. The computer readable medium encoded with computer program instructions which cause a processor to execute a method of claim 1, further comprising:

determining the average ($<s_i>_T$) of one of said sensory variables ($s_i$) over an interval of said first length (T);

evaluating rewards by calculating a function (R) of a stability motivational variable ($\sigma_i$) indicative of how close is the value ($s_i$(t)) of said sensory variable ($s_i$) at said first time (t) to the average ($<s_i>_T$) over a preceding interval of said first length (T).

7. The computer readable medium encoded with computer program instructions which cause a processor to execute a method of claim 6, further comprising:

calculating the value ($\sigma_i$(t)) of the stability motivational variable ($\sigma i$) at said first time (t) according to the following equation:

$$\sigma_i(t)=1-\sqrt{\{(s_i(t)-<s_i>_T)^2\}},$$

where $s_i$(t) is the value of said sensory variable at said first time (t).

8. The computer readable medium encoded with computer program instructions which cause a processor to execute a method of claim 1, further comprising:

applying a reward function ($r_{max}$($mot_i$)) which generates a maximum reward when the value of said at least one motivational variable ($mot_i$) is maximized.

9. The computer readable medium encoded with computer program instructions which cause a processor to execute a method of claim 1, further comprising:
applying a reward function ($r_{min}(mot_i)$) which generates a maximum reward when the value of said at least one motivational variable ($mot_i$) is minimized.

10. The computer readable medium encoded with computer program instructions which cause a processor to execute a method of claim 1, further comprising:
applying a reward function ($r_{inc}(mot_i)$) which generates a large reward when the increase in said at least one motivational variable ($mot_i$) is large.

11. The computer readable medium encoded with computer program instructions which cause a processor to execute a method of claim 1, further comprising:
applying a reward function ($r_{dec}(mot_i)$) which generates a large reward when the decrease in said at least one motivational variable ($mot_i$) is large.

12. The computer readable medium encoded with computer program instructions which cause a processor to execute a method of claim 1, further comprising:
calculating the overall reward (OR) expected to arise if a particular candidate value ($M_{Cand}$) of said set of control signals (M(t)) is selected, by taking a weighted sum of individual calculated reward values; and
calculating each of said individual reward values by applying a respective reward function ($r(mot_i)$) based on a respective different motivational variable ($mot_i$) associated with said candidate value ($M_{Cand}$) of said set of control signals (M), said different motivational variables including said at least one task-independent motivational variable.

13. A self-developing device for generating control signals for controlling action of a sensory-motor apparatus, the self-developing device comprising:
an input configured to receive and determine the value (S(t)) of a set of one or more sensory variables representative of information about the environment of said sensory-motor apparatus;
an output configured to output a set of one or more control signals (M(t)) configured to control action of said sensory motor apparatus; and
a processor configured to calculate a respective reward (R(v,t)) associated with each of a plurality of candidate values ($M_{Cand}$) that can be taken by said set of control signals (M(t)) and
configured to decide, which value should be taken by said set of control signals (M(t)), by analyzing the reward values calculated for respective different candidate values ($M_{Cand}$) that can be taken by said set of control signals;
wherein said processor is configured to evaluate respective rewards by calculating a function of a set of one or more motivational variables ($mot_i$), said set of motivational variables including at least one task-independent internal motivational variable that is independent of the type of sensory-motor apparatus being controlled, and the value of each motivational variable derived based on at least one sensory-motor variable of a set of sensory-motor variables (SM(t)) comprising said set of sensory variables (S) and a set of action variables (M) representative of the behavior of said sensory-motor apparatus;
wherein said processor is configured to perform a history-dependent calculation to calculate the value of said at least one task-independent motivational variable ($mot_i$), said history-dependent calculation being performed either by:
a) applying a history-dependent function (g) to at least one sensory-motor variable of said set, said history-dependent function (g) depending on one or more time-varying internal parameters in the computation of at least one task-independent motivational variable ($mot_i$), or
b) applying a function (f) to values (SM(T),SM(T−1)) taken at different times by at least one sensory-motor variable of said set;
wherein said processor is configured to predict, for each of said plurality of candidate values of said control signals (M), values of sensory-motor variables (SM) and of said set of motivational variables ($mot_i$) at a series of future instants;
wherein said processor is configured to calculate, for each of the plurality of candidate values ($M_{Cand}$), a reward value ($R_{MCand}$) which comprises the sum of a series of expected future rewards corresponding to said predicted values of said set of motivational variables at said series of future instants, wherein each expected reward is evaluated by calculating a function (OR) based on said at least one task-independent internal motivational variable ($mot_i$); and
wherein said processor is configured to control the output to output a set of control signals chosen based on said evaluated reward values.

14. A sensory-motor apparatus comprising:
the self-developing device of claim 13, and
a set of one or more sensors (S, IR) adapted to sense the properties of the environment comprising the environment internal and external to the sensory-motor apparatus (2); and
an actuator configured to act on the environment in accordance with the control signals (M) output by the control means (10) of the self-developing device;
wherein the set of one or more sensory-motor variables (SM) includes variables corresponding to the output from said set of sensors (S, IR).

* * * * *